(12) United States Patent
Hisano

(10) Patent No.: US 7,265,658 B2
(45) Date of Patent: Sep. 4, 2007

(54) NOTIFYING SYSTEM, INFORMATION PROVIDING APPARATUS AND METHOD, ELECTRONIC DEVICE AND METHOD, AND COMPUTER READABLE MEDIUM

(75) Inventor: Atsushi Hisano, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 113 days.

(21) Appl. No.: 11/138,701

(22) Filed: May 27, 2005

(65) Prior Publication Data
US 2005/0275543 A1 Dec. 15, 2005

(51) Int. Cl.
*B60I 1/00* (2006.01)
(52) U.S. Cl. ............... 340/436; 340/5.2; 340/5.53; 340/5.82; 340/540; 340/572.4; 340/573.1
(58) Field of Classification Search ............. 340/436, 340/573.1, 572.1, 573.4, 539.1, 539.18, 522, 340/5.2, 5.53, 5.82, 540, 5.8, 5.81; 235/375
See application file for complete search history.

(56) References Cited

U.S. PATENT DOCUMENTS

| | | | | |
|---|---|---|---|---|
| 6,793,128 | B2 * | 9/2004 | Huffman | 235/375 |
| 7,113,090 | B1 * | 9/2006 | Saylor et al. | 340/539.18 |
| 7,158,038 | B2 * | 1/2007 | Fujie | 340/573.4 |

FOREIGN PATENT DOCUMENTS

| | | |
|---|---|---|
| JP | 11-219488 | 8/1999 |
| JP | 3063291 | 8/1999 |
| JP | 2000-270125 | 9/2000 |
| JP | 2003-123883 | 4/2002 |
| JP | 2002-165211 | 6/2002 |
| JP | 2002-342861 | 11/2002 |
| JP | 2003-179697 | 6/2003 |
| JP | 2003-187360 | 7/2003 |
| JP | 2003-223690 | 8/2003 |
| JP | 2003-312395 | 11/2003 |
| JP | 2003-317175 | 11/2003 |

OTHER PUBLICATIONS

Iiyama Corporation, "Emergency Dialer (HSS30)", [online], [Searched on Dec. 15, 2003], Internet.

* cited by examiner

*Primary Examiner*—Davetta W. Goins
(74) *Attorney, Agent, or Firm*—Foley & Lardner LLP

(57) ABSTRACT

When a notification indicating the abnormality is received by a portable electronic device, an operator identification operating section identifies the operator of the portable electronic device as a user who is to receive the notification or a person having some connection with the user, based on a physical feature peculiar to an individual. If the operator is an authorized user, a message operating section makes a radio transceiver unit to receive trespass-related data including specific information specifying the place of where the behavior occurs. A security object positional information displaying section displays the specific information included in the trespass-related data on a screen of the portable electronic device. The user can notify to the police and the like based on the display. The present invention is applicable to any security system.

12 Claims, 18 Drawing Sheets

FIG. 9

| USER ID | TELEPHONE NUMBER | MAIL ADDRESS |
|---|---|---|
| 00000001 | 090-1111-1111 | aaaaa@xxxxx.ne.jp |
| 00000002 | 090-2222-2222 | bbbbb@xxxxx.ne.jp |
| 00000003 | 090-3333-3333 | ccccc@xxxxx.ne.jp |
| ⋮ | ⋮ | ⋮ |

FIG. 11

| STORAGE NUMBER | FILE NAME OF FILE STORING DATA FROM USER |
|---|---|
| zzzzzz | AAAAA |
| yyyyyy | BBBBB |
| xxxxxx | CCCCC |
| ⋮ | ⋮ |

NOTIFYING SYSTEM, INFORMATION PROVIDING APPARATUS AND METHOD, ELECTRONIC DEVICE AND METHOD, AND COMPUTER READABLE MEDIUM

BACKGROUND OF THE INVENTION

1. Field of the Invention

The present invention relates to a notifying system, an information providing system and method, an electronic device and method, and a program, and more particularly, relates to a notifying system, an information providing system and method, an electronic device and method, and a program, for notifying a user of information related to behaviors endangering or possibly endangering safety of his property, possessions or loan, or safety of a person having some connection with the user.

2. Description of the Related Art

A so-called security system is used, in which when an unauthorized person breaks into a house or a door of a vehicle is unlocked, a device detecting that situation or a person informed of such a detection directly notifies to a center, a security company, the police, etc. for protecting houses or vehicles, etc.

When a vehicle detects an accident such as a vehicle crash along with a current position of the vehicle, a wireless radio communication device equipped within the vehicle notifies a center of the occurrence of the accident along with the current position, and the center calls out an emergency vehicle. In this case, traveling time taken for the emergency car to get to the vehicle is calculated based on information of the current position of the vehicle, and information of the call-out of the emergency vehicle is transmitted to the vehicle with the result of the calculation. A passenger of the vehicle is informed of the information of the call-out of the emergency vehicle with the traveling time of the emergency vehicle by a receiver equipped within the vehicle. This method is described in JP-A-11-219488, for example.

In addition, for example in JP-A-2000-270125, a portable telephone is described including an emergency signal storing unit for storing an emergency signal in advance to prepare for anticipated emergencies; a telephone number storing unit which serves as a telephone book; a recording data storing unit which starts recording with a speech through a microphone; a display unit for displaying data and the like; a controller; a voice input/output section having the microphone and a speaker; a voice transmitting section constituted with a voice pattern storing unit and a voice pattern comparing unit; an emergency transmitting section for performing transmission by an emergency informing switch operated according to the occurrence of emergency; a normal transmitting section for performing transmission by manipulation of a normal key switch; a transceiver for transmitting and receiving data with the police station under the jurisdiction through a network; and a GPS (Global Positioning System) receiver for obtaining a current position.

In addition, a notification monitoring communication controller is described in JP-A-2003-179697, for example. When the notification monitoring communication controller receives a start-up trigger signal which is the start-up trigger of notification from a start-up event generation section, telephone number information is read from a memory and a portable radio communication terminal is called. When the response of the portable radio communication terminal to this call is confirmed, video information from one or more imaging devices is transmitted to the portable radio communication terminal. The portable radio communication terminal receives the video information from the notification monitoring communication controller and displays it on a display unit. After confirming whether emergency has occurred or not by looking at an image on this display unit, a user can take proper measures for notifying the security company, the police, etc.

In addition, for example in JP-A-2003-317175, when at least one trespass sensor placed in a security/monitor area detects a trespasser, an imaging means is activated to gather an image and a sound of a specified area, and the gathered image signal and sound signal are recorded in a recording means. In this case, in response to the detection of the trespasser, the presence of the trespasser is notified to a person to be notified, who is previously designated, by a dialer through a communication line such as an Internet, and the image signal and sound signal are transmitted. On the side of the notified person, the received image is displayed on a monitor and the received sound is output so as to report the abnormal state. The notified person confirms the monitor, and reports to the police and a security company to prevent damage caused by the trespasser so that the police or the staff rushes to the place where the trespasser is detected.

In addition, since abnormal situation cannot be confirmed by only an automatic notification that a detecting device for a picking or a glass breakage detects abnormality, the police cannot go into action in principle. However, for example in Iiyama Corporation, "Emergency Dialer (HSS30)", [online], [Searched on Dec. 15, 2003], Internet, <http://homepage2.nifty.com/cds/s_etc/t_system_110.htm>, <http://homepage2.nifty.com/cds/s_etc/t_system.htm>, when an indoor abnormal situation (for example, a sound generated when a thief looks around for things) can be recognized with a "monitoring function" of a notifying apparatus which is called an "emergency dialer", the abnormality is considered to be confirmed, and accordingly, the police goes into an prompt action in principle by calling the police.

However, in a related art, when an emergency occurs, since a name of a place where the emergency occurred is not reported to a person to be notified, the person cannot quickly and accurately notify the police and the like. In this case, since the person to be notified is in a panic, the person often cannot accurately tell the address of one's own home to the police and the like although the emergency occurs in one's house, for example.

In addition, since whether a person to notify the police and the like is an authorized person or not is not confirmed, there is a possibility that a police is sent out for fun.

Therefore, it cannot be said that a quick and correct notification is sent to the police and the like.

SUMMARY OF THE INVENTION

A notifying system of the present invention comprises an apparatus that provides data indicative of a behavior, and a portable electronic device that notifies a user of a detection of the behavior, wherein the apparatus includes a first receiver that receives location information of the behavior, and a transmitter that transmits the data including the location information to the portable electronic device, and wherein the portable electronic device includes a second receiver that receives the data from the apparatus, and a display that displays the location information.

A notifying system of the present invention comprises an information providing apparatus for providing a trespass-related data, which is a data related to a behavior endangering or possibly endangering safety of property, possession or loan of a user, or safety of a person having some connection with the user, and a portable electronic device for notifying the user of detection of the behavior, wherein the information providing apparatus includes a first receiving section for receiving a specific information specifying a place where the behavior occurs, and a transmitting section for transmitting the trespass-related data including the specific information to the portable electronic device, and wherein the portable electronic device includes a second receiving section for receiving the trespass-related data transmitted from the information providing apparatus, and a displaying section for displaying the specific information included in the trespass-related data.

A portable electronic device of the present invention for notifying a user of detection of a behavior based on data indicative of the behavior and provided by an information providing apparatus, the portable electronic device comprises a receiver that receives the data, which includes location information of the behavior, from the information providing apparatus, and a display that displays the location information.

A portable electronic device of the present invention for notifying a user of detection of a behavior endangering or possibly endangering safety of property, possession or loan of the user, or safety of a person having some connection with the user, based on a trespass-related data related to the behavior and provided by an information providing apparatus, the portable electronic device comprises a receiving section for receiving the trespass-related data, which includes a specific information specifying a place where the behavior occurs, transmitted from the information providing apparatus, and a displaying section for displaying the specific information included in the trespass-related data.

In the portable electronic device according to the present invention, the trespass-related data is received by the receiving section, which includes specific information specifying a place where the behavior occurs and is transmitted from the information providing apparatus. Then, the specific information included in the trespass-related data is displayed by the displaying section.

Accordingly, when an emergency occurs, since a name of a place where the emergency occurred is reported to a person to be notified, it is possible to quickly and accurately notify the police or the fire station, etc.

The receiving section may be a receiver that can receive data transmitted from the other party through a fixed-line or a wireless network, and for example, may be configured of a radio transceiver unit. The displaying device may be a device that can display image or text information, and for example, may be configured of a display such as an LCD (Liquid Crystal Display) panel or an organic EL (Electro Luminescence) panel.

The portable electronic device according to the present invention further includes an identifying section that identifies whether an operator of the portable electronic device is authorized to receive the notification based on biometric information.

The portable electronic device according to the present invention further includes an identifying section for identifying an operator whether the operator is the user to receive the notification or the person having some connection with the user, based on a physical feature peculiar to an individual.

In the portable electronic device according to the present invention, an operator is identified whether the operator is the user to receive the notification or the person having some connection with the user in the identifying section, based on a physical feature peculiar to an individual.

Accordingly, since whether a person to notify the police and the like is an authorized person or not is confirmed, mischief or an incorrect notification can be prevented. Therefore, the police and the like do not need to determine the notification is correct or incorrect, resulting in prompt turnout of the police and the like.

The identifying section identifies the operator whether the operator is the authorized person, for example, based on biometric information of the operator (a face image, a fingerprint pattern, an iris pattern, a retina pattern, a voiceprint, etc.).

The portable electronic device according to the present invention further includes a connection controlling section for controlling a connection of a communication network to a public organization responsible for protection of life, body, or property of the people, in response to an operation by the user.

In the portable electronic device according to the present invention, in response to the operation by the user, the connection of the communication network to a public organization responsible for protection of life, body, or property of the people is controlled by the connection controlling section.

Accordingly, when an emergency occurs, a notification can be sent to the police or the fire station more quickly.

The connection controlling section may be configured with, for example, a CPU (Central Processing Unit), a dedicated circuit, etc.

The portable electronic device of the present invention further comprises a generating section for acquiring a conversation carried on through the communication network and generating a voice data corresponding to the conversation, and a storing section for storing the voice data.

In the portable electronic device according to the present invention, by the generating section, the conversation carried on through the communication network is acquired and the voice data corresponding to the conversation is generated, and the voice data is stored by the storing section.

Accordingly, for example, the voice data may be used for subsequent investigation by the police.

The generating section may be configured with, for example, a microphone, or a circuit or program for codec. The storing section may be configured with, for example, a flash memory, SRAM (Static Random Access Memory), DRAM (Dynamic Random Access Memory), or a hard disk.

The portable electronic device according to the present invention further comprises a transmitting section for transmitting the voice data, along with a time information indicating time when the communication network is connected, to the information providing apparatus.

In the portable electronic device according to the present invention, by the transmitting section, the voice data is transmitted to the information providing apparatus along with the time information indicating time when the communication network is connected.

Accordingly, for example, notification time may be specified and the voice data may be used for subsequent investigation by the police.

The transmitting section may be configured with, for example, a transceiver unit and the like including an antenna.

The receiving section receives the trespass-related data further including content information indicating a content of the behavior, and the display section displays the content information included in the trespass-related data.

Accordingly, when an emergency occurs, since detail and the like of the emergency can be notified, a notification can be more appropriately sent to the police, the fire station and the like.

A method of the present invention for notifying a user of detection of a behavior based on data indicative of the behavior and provided by an information providing apparatus, the method comprises receiving the data, which includes location information of the behavior from the information providing apparatus, and displaying the location information.

A notifying method of the present invention for notifying a user of detection of a behavior endangering or possibly endangering safety of property, possession or loan of the user, or safety of a person having some connection with the user, based on a trespass-related data related to the behavior and provided by an information providing apparatus, the notifying method comprises receiving the trespass-related data, which includes a specific information specifying a place where the behavior occurs, transmitted from the information providing apparatus, and displaying the specific information included in the trespass-related data.

In the notifying method of the present invention, the trespass-related data, which includes specific information specifying a place where the behavior occurs, transmitted from the information providing apparatus, are received. Then, the specific information included in the trespass-related data is displayed.

Accordingly, when an emergency occurs, since detail and the like of the emergency can be notified, a notification can be more appropriately sent to the police, the fire station and the like.

A computer readable medium of the present invention comprising a program including instructions for permitting a computer to perform a process for notifying a user of detection of a behavior, based on data indicative of the behavior and provided by an information providing apparatus, the instructions comprises receiving the data from the information providing apparatus, the data including location information of the behavior, and displaying the location information.

A computer readable medium of the present invention comprising a program permitting a computer to perform a notifying process for notifying a user of detection of a behavior endangering or possibly endangering safety of property, possession or loan of the user, or safety of a person having some connection with the user, based on a trespass-related data related to the behavior and provided by an information providing apparatus, the program is operative to receive the trespass-related data transmitted from the information providing apparatus, the trespass-related data including a specific information specifying a place where the behavior occurs, and display the specific information included in the trespass-related data.

In the computer readable medium according to the present invention, the trespass-related data, which includes specific information specifying a place where the behavior occurs, transmitted from the information providing apparatus, is received and the specific information included in the trespass-related data is displayed.

Accordingly, when an emergency occurs, since detail and the like of the emergency can be notified, a notification can be more appropriately sent to the police, the fire station and the like.

An apparatus according to the present invention for providing data indicative of a behavior to a portable electronic device for notifying a user of detection of the behavior, the apparatus comprises a first receiver that receives location information of the behavior; and a transmitter that transmits the data including the location information to the portable electronic device.

An information providing apparatus according to the present invention for providing a trespass-related data, which is related to a behavior endangering or possibly endangering safety of property, possession or loan of a user, or safety of a person having some connection with the user, to a portable electronic device for notifying the user of detection of the behavior, the information providing apparatus comprises a first receiving section for receiving a specific information specifying a place where the behavior occurs, and a transmitting section for transmitting the trespass-related data including the specific information to the portable electronic device.

In the information providing apparatus according to the present invention, the specific information specifying the place where the behavior is received by the receiving section, and the trespass-related data including the specific information is transmitted to the portable electronic device by the transmitting section.

The receiving section may be configured with, for example, a wireless or wired NIC (Network Interface Card), a modem, etc. The transmitting section may be configured with, for example, a wireless or wired NIC, a modem, etc.

Accordingly, when an emergency occurs, since detail and the like of the emergency can be notified, a notification can be more appropriately sent from the portable electronic device to the police, the fire station and the like.

The information providing apparatus according to the present invention further includes a second receiving section for receiving voice data corresponding to a conversation carried on through a communication network between a public organization responsible for protection of life, body, or property of the people, and time information indicating time when the communication network is connected, the voice data and the time information being transmitted from the portable electronic device, and recording section for recording the voice data and the time information, along with the trespass-related data, in correspondence to the trespass-related data.

In the information providing apparatus according to the present invention, the voice data corresponding to the conversation carried on through the communication network between the public organization responsible for protection of life, body, or property of the people and the time information indicating time when the communication network is connected, the voice data and the time information being transmitted from the portable electronic device are received by the second receiving section. Then, the voice data and the time information, along with the trespass-related data, are recorded by the recording section in correspondence to the trespass-related data.

Accordingly, for example, the voice data or the time information may be used in subsequent investigation by the police.

The receiving section may include, for example, a wireless or wired NIC, a modem, etc. The recording section may be configured with a hard disk, a magnetic tape, etc.

A method according to the present invention for providing data indicative of a behavior to a portable electronic device for notifying a user of detection of the behavior, the method comprises receiving location information of the behavior, and transmitting the data including the location information to the portable electronic device.

An information providing method according to the present invention for providing a trespass-related data, which is related to a behavior endangering or possibly endangering safety of property, possession or loan of a user, or safety of a person having-some connection with the user, to a portable electronic device for notifying the user of detection of the behavior, the information providing method comprises receiving a specific information specifying a place where the behavior occurs, and transmitting the trespass-related data including the specific information to the portable electronic device.

In the information providing method according to the present invention, the specific information specifying the place where the behavior occurs is received, and the trespass-related data including the specific information is transmitted to the portable electronic device.

Accordingly, when an emergency occurs, since detail and the like of the emergency can be notified, a notification can be more appropriately sent from the portable electronic device to the police, the fire station and the like.

A computer readable medium of the present invention comprising a program including instructions for permitting a computer to perform a process for providing data indicative of a behavior, to a portable electronic device for notifying a user of a detection of the behavior, the instructions comprises receiving location information of the behavior, and transmitting the data including the location information to the portable electronic device.

A computer readable medium of the present invention comprising a program permitting a computer to perform an information providing process for providing a trespass-related data, which is related to a behavior endangering or possibly endangering safety of property, possession or loan of a user, or safety of a person having some connection with the user, to a portable electronic device for notifying the user of detection of the behavior, the program is operative to receive a specific information specifying a place where the behavior occurs, and transmit the trespass-related data including the specific information to the portable electronic device.

In the computer readable medium according to the present invention, the specific information specifying the place where the behavior occurs is received, and the trespass-related data including the specific information is transmitted to the portable electronic device.

Accordingly, when an emergency occurs, since detail and the like of the emergency can be notified, a notification can be more appropriately sent from the portable electronic device to the police, the fire station and the like.

A notifying system of the present invention comprises an apparatus for providing data indicative of a behavior, and a portable electronic device for notifying a user of a detection of the behavior, wherein the apparatus includes a transmitter that transmits the data to the portable electronic device, and wherein the portable electronic device includes a receiver that receives the data from the apparatus, an identifying section that identifies whether an operator is authorized to receive the notification, based on biometric information, and a display section that displays an image based on the data, when the operator is identified as authorized. Herein, the image may include text information, graphics, etc.

A notifying system according to the present invention comprises an information providing apparatus for providing a trespass-related data related to a behavior endangering or possibly endangering safety of property, possession or loan of a user, or safety of a person having some connection with the user, and a portable electronic device for notifying the user of detection of the behavior, wherein the information providing apparatus includes a transmitting section for transmitting the trespass-related data to the portable electronic device, and wherein the portable electronic device includes a receiving section for receiving the trespass-related data transmitted from the information providing apparatus, an identifying section for identifying an operator whether the operator is the user to receive the notification or the person having some connection with the user, based on a physical feature peculiar to an individual, and a displaying section for displaying an image based on the trespass-related data, when the operator is identified as the user to receive the notification or the person having some connection with the user.

A portable electronic device according to the present invention includes receiving section for receiving trespass-related data transmitted from an information providing apparatus, identifying for identifying an operator whether the operator is the user to receive the notification or the person having some connection with the user, based on a physical feature peculiar to an individual, and displaying section for displaying an image based on the trespass-related data, when the operator is identified as the user to receive the notification or the person having some connection with the user.

A portable electronic device according to the present invention for notifying a user of detection of a behavior, based on data indicative of the behavior and provided from an information providing apparatus, the portable electronic device comprises a receiver that receives the data from the information providing apparatus, an identifying section that identifies whether an operator is authorized to receive the notification based on biometric information, and a display that displays an image based on the data, when the operator is identified as authorized.

A portable electronic device according to the present invention for notifying a user of detection of a behavior endangering or possibly endangering safety of property, possession or loan of the user, or safety of a person having some connection with the user, based on a trespass-related data related to the behavior and provided from an information providing apparatus, the portable electronic device comprises a receiving section for receiving the trespass-related data transmitted from the information providing apparatus, an identifying section for identifying an operator whether the operator is the user to receive the notification or the person having some connection with the user, based on a physical feature peculiar to an individual, and a displaying section for displaying an image based on the trespass-related data, when the operator is identified as the user to receive the notification or the person having some connection with the user.

Accordingly, since whether a person to notify the police, the fire station and the like is an authorized person or not is confirmed, mischief or an incorrect notification can be prevented. Therefore, the police and the like can go into a prompt action.

The receiving section may be a receiver that can receive data transmitted from the other party through a fixed-line or a wireless network, and for example, may be configured of a radio transceiver unit. The displaying device may be a device that can display image or text information, and for example, may be configured of a display such as an LCD panel or an organic EL panel. The identifying section identifies the operator whether the operator is the authorized person, for example, based on biometric information of the operator (a face image, a fingerprint pattern, an iris pattern, a retina pattern, a voiceprint, etc.).

The portable electronic device according to the present invention further comprises a connection controller that controls a connection of a communication network to an organization in response to an operation by the user.

The portable electronic device according to the present invention further includes a connection controlling section for controlling a connection of a communication network to a public organization responsible for protection of life, body, or property of the people, in response to an operation by the user.

In the portable electronic device according to the present invention, in response to the operation by the user, the communication network connection to the public organization responsible for protection of life, body, or property of the people is controlled by the connection controlling section.

The public organization responsible for protection of life, body, or property of the people is, for example, the police, fire station, etc.

Accordingly, when an emergency occurs, a notification can be more quickly sent to the police, the fire station and the like.

The connection controlling section may be configured with, for example, a CPU, a dedicated circuit, etc.

The portable electronic device of the present invention further comprises a generating section that acquires communication on the communication network and generates voice data corresponding to the communication, and a storing section that stores the voice data.

The portable electronic device of the present invention further comprises a generating section for acquiring a conversation carried on through the communication network and generating a voice data corresponding to the conversation, and a storing section for storing the voice data.

In the portable electronic device of the present invention, by the generating section, the conversation carried on through the communication network is acquired and the voice data corresponding to the conversation is generated. Then, the voice data is stored by the storing section.

Accordingly, for example, the voice data may be used for subsequent investigation by the police.

The generating section may be configured with, for example, a microphone, or a circuit or program for codec. The storing section may be configured with, for example, a flash memory, SRAM, DRAM, or a hard disk.

The portable electronic device according to the present invention further comprises a transmitter that transmits the voice data and time information indicating when the communication network is connected, to the information providing apparatus.

The portable electronic device according to the present invention further comprises a transmitting section for transmitting the voice data, along with a time information indicating time when the communication network is connected, to the information providing apparatus.

In the portable electronic device according to the present invention, the voice data, along with the time information indicating time when the communication network is connected, is transmitted to the information providing apparatus by the transmitting section.

Accordingly, for example, notification time may be specified and the voice data may be used for subsequent investigation by the police.

The transmitting section may be configured with, for example, a transceiver unit and the like including an antenna.

The receiver receives the data further including behavior content information, and the display displays the behavior content information included in the data.

The receiving section receives the trespass-related data further including content information indicating a content of the behavior, and the display section displays the content information included in the trespass-related data.

Accordingly, when an emergency occurs, since detail and the like of the emergency can be notified, a notification can be more appropriately sent to the police, the fire station and the like.

A method according to the present invention for notifying a user of detection of a behavior based on data indicative of the behavior and provided by an information providing apparatus, the method comprises receiving the data from the information providing apparatus, identifying whether an operator is authorized to receive the notification based on biometric information, and displaying an image based on the data, when the operator is identified as authorized.

A notifying method according to the present invention for notifying a user of detection of a behavior endangering or possibly endangering safety of property, possession or loan of the user, or safety of a person having some connection with the user, based on a trespass-related data related to the behavior and provided by an information providing apparatus, the notifying method comprises receiving the trespass-related data transmitted from the information providing apparatus, identifying an operator whether the operator is the user to receive the notification or the person having some connection with the user, based on a physical feature peculiar to an individual, and displaying an image based on the trespass-related data, when the operator is identified as the user to receive the notification or the person having some connection with the user.

In the notifying method according to the present invention, the trespass-related data transmitted from an information providing apparatus is received, the operator is identified whether the operator is the user to receive the notification or the person having some connection with the user, based on a physical feature peculiar to an individual, and, when the operator is identified as the user to receive the notification or the person having some connection with the user, the image is displayed based on the trespass-related data.

Accordingly, when an emergency occurs, since detail and the like of the emergency can be notified, a notification can be more appropriately sent to the police, the fire station and the like.

A computer readable medium according to the present invention comprising a program including instructions for permitting a computer to perform a process for notifying a user of a detection of a behavior, based on data indicative of the behavior and provided by an information providing apparatus, the instructions comprises receiving the data transmitted from the information providing apparatus, identifying whether an operator is authorized to receive the notification based on biometric information, and displaying an image based on the data, when the operator is identified as authorized.

A computer readable medium according to the present invention comprising a program permitting a computer to perform a notifying process for notifying a user of detection of a behavior endangering or possibly endangering safety of property, possession or loan of the user, or safety of a person having some connection with the user, based on a trespass-related data related to the behavior and provided by an information providing apparatus, the program being operative to receive the trespass-related data transmitted from the information providing apparatus, identify an operator whether the operator is the user to receive the notification or the person having some connection with the user, based on a physical feature peculiar to an individual, and display an image based on the trespass-related data, when the operator is identified as the user to receive the notification or the person having some connection with the user.

In the computer readable medium according to the present invention, the trespass-related data transmitted from an information providing apparatus is received, the operator is identified whether the operator is the user to receive the notification or the person having some connection with the user, based on a physical feature peculiar to an individual, and, when the operator is identified as the user to receive the notification or the person having some connection with the user, the image is displayed based on the trespass-related data.

Accordingly, when an emergency occurs, since detail and the like of the emergency can be notified, a notification can be more appropriately sent to the police, the fire station and the like.

A portable electronic device of the present invention comprises a transceiver that receives a data generated in response to a detection of a behavior, and transmits the data to an extractor that provides an authenticated user with a message indicative of the behavior including location information of the behavior, a communicator that interfaces with the user and a base station to enable communication between the authenticated user and a third party, and an activator that provides the third party with a response command to act on a region where the behavior is detected based on the message.

According to the invention, when a behavior endangering or possibly endangering safety of his property, possessions or loan, or safety of a person having some connection with the user occurs, the behavior can be notified. In addition, according to the invention, a place where the behavior occurred can be quickly and correctly notified.

According to the invention, when a behavior endangering or possibly endangering safety of his property, possessions or loan, or safety of a person having some connection with the user occurs, an address and a name of the place where the behavior occurred can be displayed on the portable electronic device. In addition, according to the invention, the portable electronic device can quickly and correctly notify of the place where the behavior occurred.

According to the invention, when a behavior endangering or possibly endangering safety of his property, possessions or loan, or safety of a person having some connection with the user occurs, the information providing apparatus can notify of the behavior. In addition, according to the invention, the information providing apparatus can quickly and correctly notify of a place where the behavior occurred.

According to the invention, since it is confirmed whether a person to notify the police, the fire station and the like is an authorized person or not, mischief or an incorrect notification can be prevented. Accordingly, the police and the like can go into a prompt action. In addition, according to the invention, when a behavior endangering or possibly endangering safety of his property, possessions or loan, or safety of a person having some connection with the user occurs, the behavior can be notified. In addition, according to the invention, a place where the behavior occurred can be quickly and correctly notified.

According to the invention, in the portable electronic device, since it is confirmed whether a person to report to the police, the fire station and the like is an authorized person or not, mischief or an incorrect notification can be prevented. Accordingly, the police and the like can go into a prompt action. In addition, according to the invention, when a behavior endangering or possibly endangering safety of his property, possessions or loan, or safety of a person having some connection with the user occurs, the behavior can be notified. In addition, according to the invention, a place where the behavior occurred can be quickly and correctly notified.

BRIEF DESCRIPTION OF THE DRAWINGS

FIG. 9 is a diagram showing an example of a telephone number corresponding table.

FIG. 11 is a diagram showing an example of a corresponding table.

DESCRIPTION OF THE PRFERRED EMBODIMENTS

Hereinafter, embodiments according to the present invention will be described with reference to the accompanying drawings.

Figure 1:
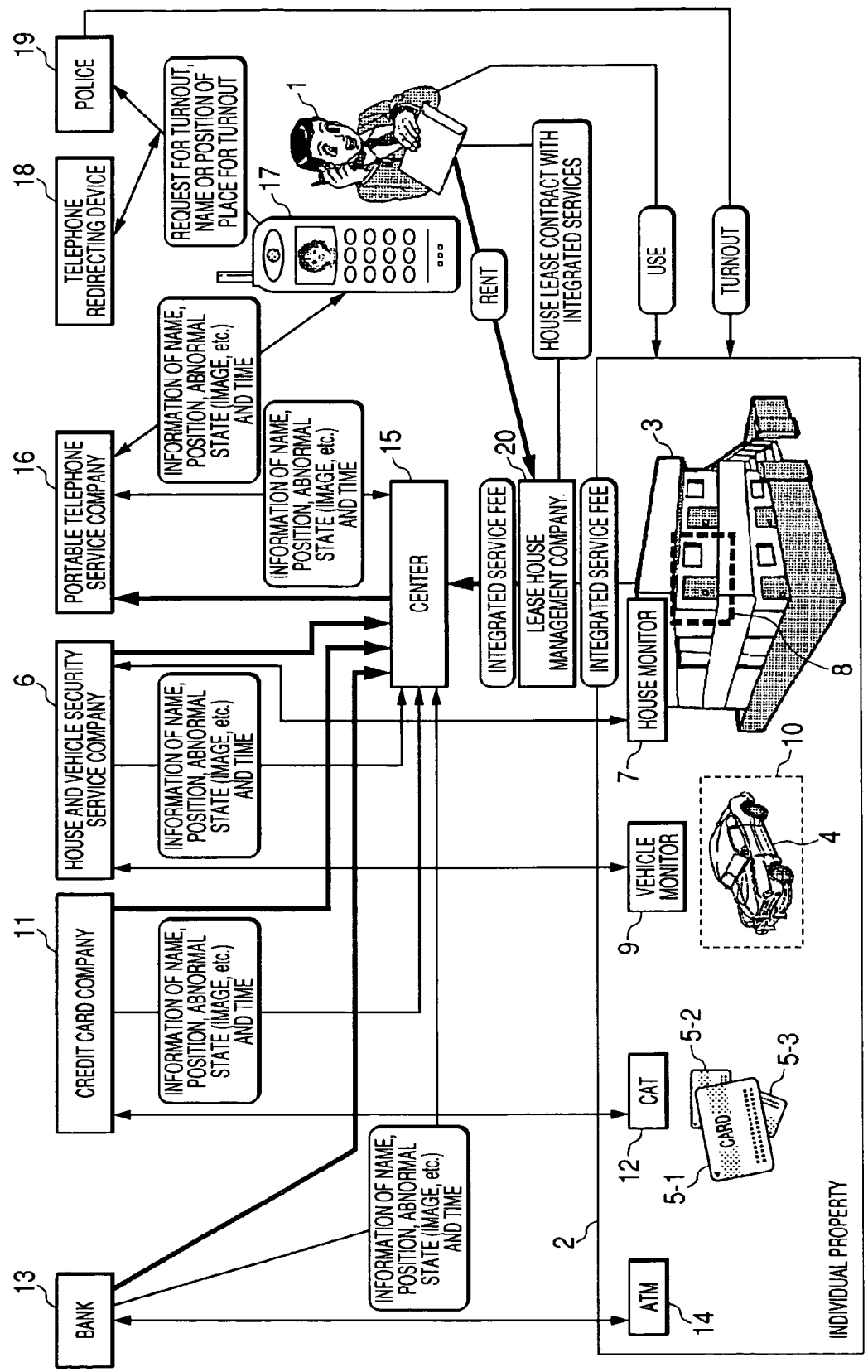
FIG. 1 is a diagram illustrating a business model corresponding to a notifying system according to the present invention.

FIG. 1 is a diagram illustrating a business model corresponding to a notifying system according to the present invention.

When a situation in which safety of property, possessions or loan of a user 1 is endangered or possibly endangered occurs, a notifying system notifies a portable electronic device 17 of the place where the situation occurs and a name of the place through a center 5. The situation in which safety of property, possessions or loan is endangered or possibly endangered is a case where an unauthorized person trespasses on another person's house, a door lock of a vehicle is unlocked, or goods and the like are purchased by using a stolen credit card. The property includes a corporeal property and an incorporeal property.

When the notifying system determines to send a notification to a police or a fire station, the notifying system makes the user 1 to sends the notification after confirming that the user 1 has the right to send the notification.

Hereinafter, a behavior endangering or possibly endangering safety of his property, possessions or loan is simply called as a trespass behavior.

An individual property 2 includes things that the user 1 owns or leases, or incorporeal property of the user 1. The individual property 2 may include, for example, a house 3, a vehicle 4, a credit card 5-1 or 5-2, a cash card 5-3, etc.

A house and vehicle security service company 6 sets a video camera or a microphone, etc. in the house 3 or the vehicle 4, and monitors a given monitoring area, for example, an area 8 or 10 including the house 3, or a part of the house 3, or the vehicle 4, using a house monitor 7 or a vehicle monitor 9.

When a situation in which the house 3 or the vehicle 4 is endangered occurs, the house and vehicle security service company 6 provides an information of name, position, abnormal state (an image, etc.), and time, which are transmitted from the house monitor 7 or the vehicle monitor 9, to the center 15.

Hereinafter, the information of name, position, abnormal state (an image, etc.), and time is referred to as a trespass-related data.

A credit card company 11 sets a video camera or an infrared camera, etc. for photographing a user of the credit card 5-1 in a CAT (credit authorization terminal) 12. A monitoring center (not shown) of the credit card company 11 performs a monitoring operation by recording an image captured by the camera and confirming it.

When a situation in which the credit card 5-1 is illegally used occurs, the credit card company 11 provides the trespass-related data, which are transmitted from the monitoring center, to the center 15.

A bank 13 sets a video camera or an infrared camera, etc. for photographing a user of the cash card 5-3 in an ATM (automated teller machine) 14. A monitoring center of the bank 13 performs a monitoring operation by recording an image captured by the camera and confirming it.

When a situation in which the cash card 5-3 is illegally used occurs, the bank 13 provides the trespass-related data, which are transmitted from the monitoring center, to the center 15.

The center 15 receives the trespass-related data from the house and vehicle security service company 6, the credit card company 11, or the bank 13, and provides the received trespass-related data to the portable electronic device 17 through a portable telephone service company 16.

That is, the portable electronic device 17 receives the trespass-related data through a management company such as the house and vehicle security service company 6, the center 15 and the portable telephone service company 16, and displays information included in the received trespass-related data on a screen.

The user 1 sends a notification to the police and the like based on the information (for example, contents of a trespass behavior or a name and position of a place where the trespass behavior is performed) displayed on the screen of the portable electronic device 17. Since the user 1 can send the notification while looking at the information displayed on the screen of the portable electronic device 17, a more reliable and precise notification can be ensured.

The portable electronic device 17 contacts the police 19 through a telephone redirecting device 18. By using the telephone redirecting device 18, the police closer to the individual property 2 can be requested for turnout.

In addition, a notification may be sent not only to the police but also to a public organization, such as a fire station or the Coast Guard, who is responsible for protection of life, body, or property of the people.

Further, for example, the house 3 may be a house leased from and generally managed by a lease house management company 20 according to a so-called house lease contract with integrated services. In this case, the lease house management company 20 pays an integrated service fee to a company managing the center 15.

The police requested for turnout can quickly get to the spot based on the information (for example, the name or position of the place where the trespass behavior is performed) notified from the user 1. As a result, there is a high possibility that the property, etc. of the user 1 is protected from the trespass behavior.

Hereinafter, the following description will be given with an example of the police as a site to receive a notification from the user 1.

Figure 2:
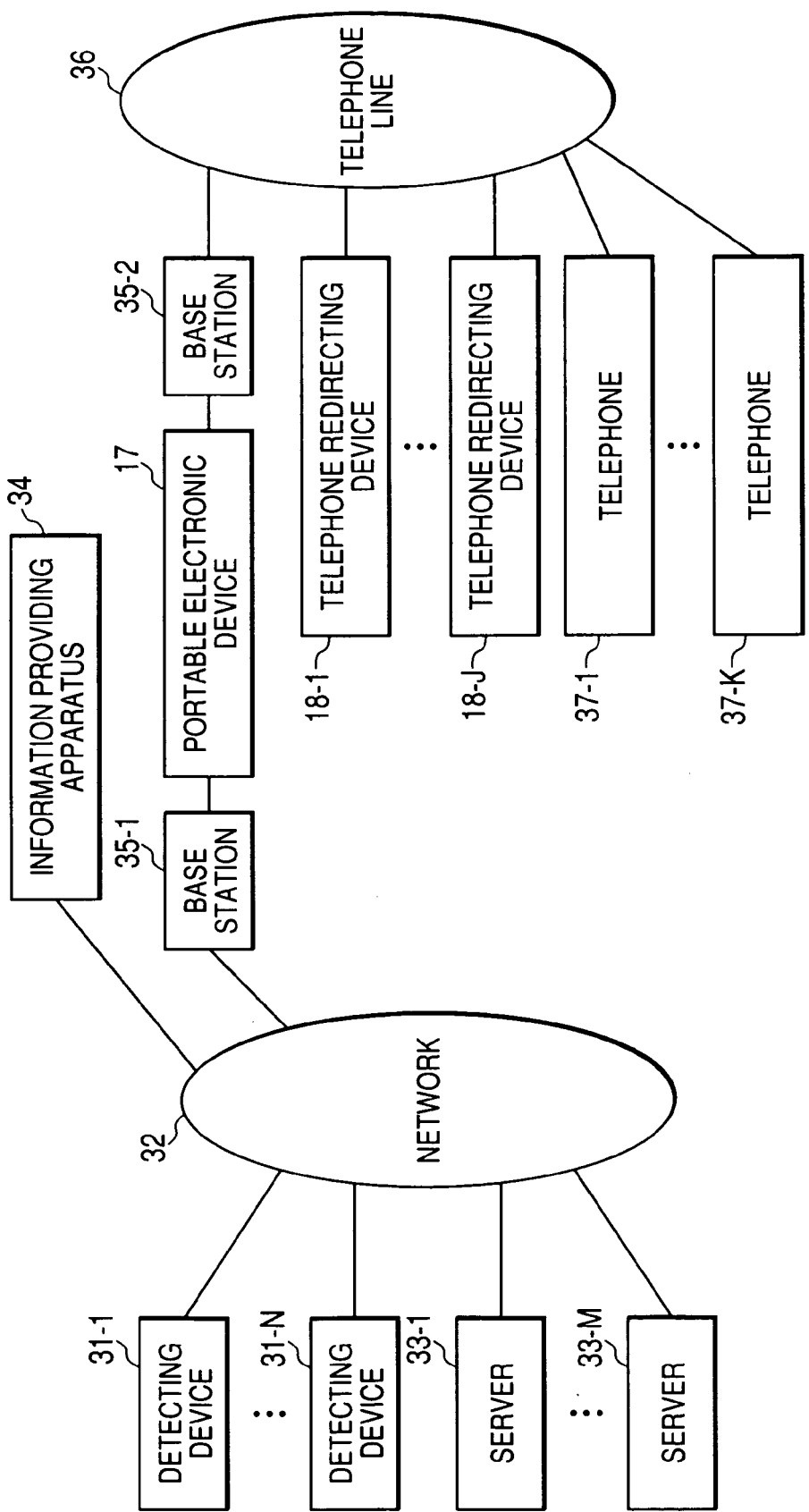
FIG. 2 is a diagram showing a configuration of a notifying system according to an embodiment of the present invention.

A configuration of the notifying system according to the present invention will be described with reference to FIG. 2. FIG. 2 is a block diagram showing a general configuration of the notifying system according to the present invention.

As shown in FIG. 2, the notifying system according to the present invention includes, for example, the portable electronic device 17, telephone redirecting devices 18-1 to 18-J, detecting devices 31-1 to 31-N, a network 32, servers 33-1 to 33-M, an information providing apparatus 34, base stations 35-1 and 35-2, a telephone line 36, and telephones 37-1 to 37-K.

When at least any one of the detecting devices 31-1 to 31-N detects a behavior endangering or possibly endangering safety of his property, possessions or loan of the user 1, or safety of a person having some connection with the user 1, at least any one of the detecting devices 31-1 to 31-N provides an abnormal signal to any one of the servers 33-1 to 33-M through the network 32. For example, at least any one of the detecting devices 31-1 to 31-N, such as a video camera, an infrared camera, a microphone, and a vibration sensor, provides the abnormal signal to any one of the servers 33-1 to 33-M through the network 32 when detecting a predetermined object for detection.

The abnormal signal is a signal indicating a behavior endangering or possibly endangering safety of his property, possessions or loan of the user 1, or safety of a person having some connection with the user 1, and includes, for example, an image data of the photographed behavior or a voice data sampled from the voice generated in the behavior, etc.

More specifically, the detecting devices 31-1 to 31-N may be a sensor installed in the house 3 or the vehicle 4 for sensing a trespasser or unlock of a door lock, a device for photographing a user of the credit card 5-1 in the CAT 12, or a device for photographing a user of the cash card 5-3 in the ATM 14, etc.

The network 32 transmits the abnormal signal provided by the detecting devices 31-1 to 31-N from the detecting devices 31-1 to 31-N to the servers 33-1 to 33-M. In addition, the network 32 transmits the abnormal signal provided by the servers 33-1 to 33-M to the information providing apparatus 34. In addition, the network 32 transmits the abnormal signal provided by the information providing apparatus 34 to the portable electronic device 17 via the base station 35-1.

The network 32 is, for example, an electric communication network enabling a bi-directional communication between the two among the detecting devices 31-1 to 31-N, servers 33-1 to 33-M, the information providing apparatus 34, and the base station 35-1. The network 32 is configured with, for example, a wired communication line based on a standard such as RS-422 or RS-232c, or a wireless communication line based on a standard such as IEEE (Institute of Electrical and Electronic Engineers) 802. 11a.

In addition, the network 32 may be configured with not only the above-mentioned examples but also various private or public networks including an optical fiber network such as FDDI (Fiber Distributed Data Interface), a satellite communication network, Ethernet (registered as a trade mark), LAN (Local Area Network), or Internet.

The servers 33-1 to 33-M provide the abnormal signal, which is transmitted from the detecting devices 31-1 to 31-N, to the information providing apparatus 34 through the network 32.

The servers 33-1 to 33-M are, for example, information providing apparatuses for gathering and providing information on security managed by security service providers and the like.

The information providing apparatus 34 provides the abnormal signal, which is transmitted from the servers 33-1 to 33-M through the network, to the portable electronic device 17 via the base station 35-1. Details of the information providing apparatus 34 will be described later with reference to FIG. 5.

The base station 35-1, which is a radio station, transmits the abnormal signal, which is transmitted from the information providing apparatus 34 through the network 32, from the information providing apparatus 34 to the portable electronic device 17.

The portable electronic device 17 displays a text, image, or menu showing the trespass behavior on the screen based on the abnormal signal provided by the information providing apparatus 34 via the base station 35-1. The portable electronic device 17 may be, for example a portable telephone, a PDA (Personal Digital Assistant), a wristwatch, a portable personal computer, or a dedicated remote controller, etc.

When the menu is manipulated, the portable electronic device 17 can be connected to any one of the telephones 37-1 to 37-K of the police by calling any one of the telephones 37-1 to 37-K in order to send a notification to the police, for example.

In addition, the portable electronic device 17 can generate the voice data by sampling the contents of a call (conversation) for notification to the police, and transmit the generated voice data to the information providing apparatus 34 via the base station 35-1 and the network 32. Then, the portable electronic device 17 records the voice data representing the contents of the call for notification in the information providing apparatus 34. Details of the portable electronic device 17 will be described later with reference to FIG. 6.

In this way, the abnormal signal from the detecting devices 31-1 to 31-N is transmitted to the portable electronic device 17 through the network 32, the servers 33-1 to 33-M, the information providing apparatus 34, and the base station 35-1.

When the notification is sent to the police, the portable electronic device 17 is connected to any one of the telephone redirecting devices 18-1 to 18-J through the base station 35-2 and the telephone line 36.

When the portable electronic device 17 is connected to the telephone redirecting devices 18-1 to 18-J through the base station 35-2 and the telephone line 36, the telephone redirecting devices 18-1 to 18-J connect the portable electronic device 17 to any one of the telephones 37-1 to 37-K through the base station 35-2 and the telephone line 36.

Each of the telephone redirecting devices 18-1 to 18-J connects, for example, the portable electronic device 17 to the telephone 37 of the police in a police district where each of the telephone redirecting devices 18-1 to 18-J is installed.

For example, assuming that the user 1 having his house in Tokyo stays in Osaka, when abnormal notification is sent from a notifying apparatus installed in the house to the user 1, accordingly, the user 1 in Osaka pushes a call number 110 (which is an emergency call number to call the police). Since a connection site responds to a place where the call is performed, the portable electronic device 17 is connected to the telephone 37 of an Osaka police in Osaka.

However, a notification to the Osaka police remote from the house in Tokyo cannot anticipate a prompt measure for the house.

To solve this problem, the portable electronic device 17 of the user 1 is directly connected to a telephone 37 of the police in Tokyo where the house of the user 1 exists by using the telephone redirecting devices 18-1 to 18-J, allowing a notification to the Tokyo police. As a result, a proper measure such as a prompt turnout of the police can be anticipated.

In this way, the portable electronic device 17 is connected to any one of the telephones 37-1 to 37-K through the base station 35-2, the telephone line 36, and any one of the telephone redirecting devices 18-1 to 18-J.

The telephones 37-1 to 37-K are respectively installed in command centers of the police that give command to the police to go into action, for example.

In this way, since a call between the portable electronic device 17 and one of the telephones 37-1 to 37-K of the police in a command center is immediately initiated, the user 1 can quickly notify the police of the trespass behavior, and for example, request the police to go into action.

Hereinafter, the telephone redirecting devices 18-1 to 18-J are simply referred to as a telephone redirecting device 18 when it is not necessary to distinguish each of the telephone redirecting devices 18-1 to 18-J. Also, the detecting devices 31-1 to 31-N are simply referred to as a detecting device 31 if it is not necessary to distinguish each of the detecting devices 31-1 to 31-N. Also, the servers 33-1 to 33-M are simply referred to as a server 33 if it is not necessary to distinguish each of the servers 33-1 to 33-M. In addition, the telephones 37-1 to 37-K are simply referred to as a telephone 37 if it is not necessary to distinguish each of the telephones 37-1 to 37-K.

Figure 3:
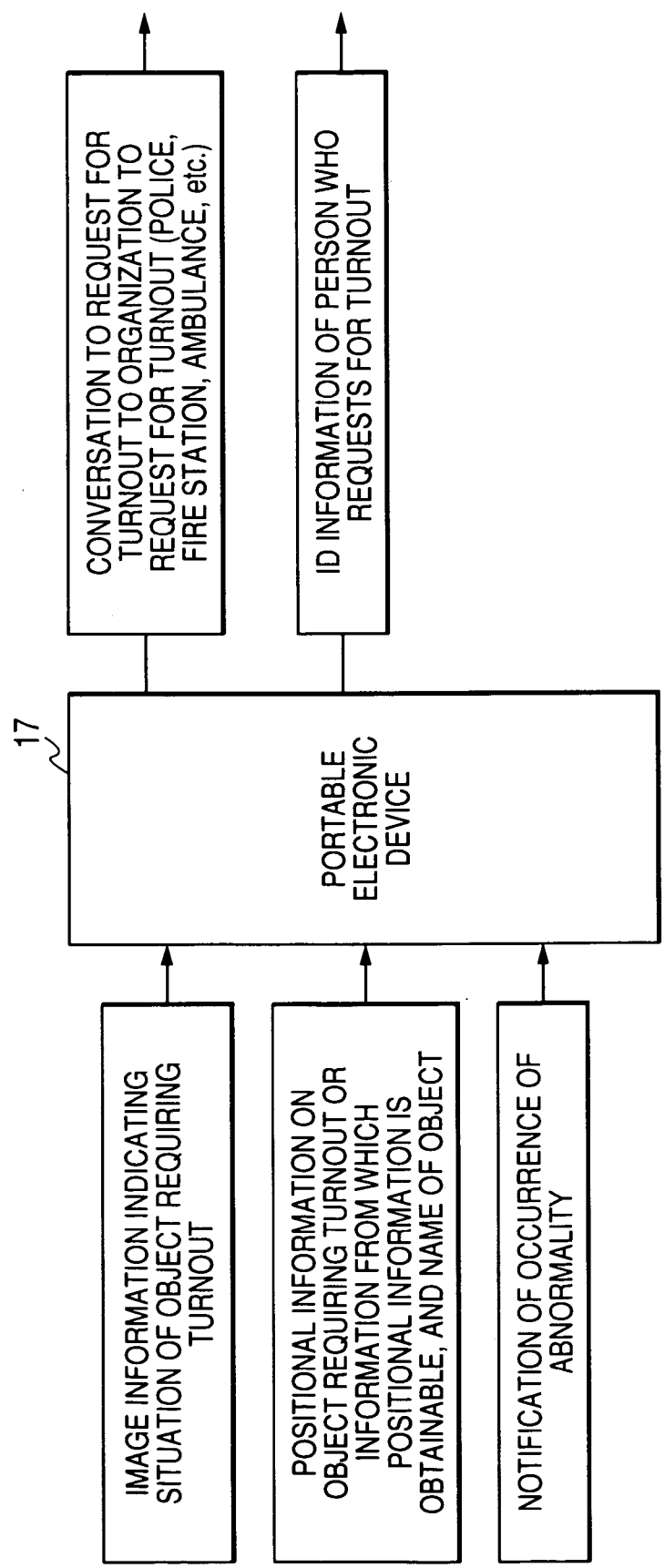
FIG. 3 is a diagram illustrating input and output information of a portable electronic device.

FIG. 3 is a diagram illustrating details of input and output data of the portable electronic device 17.

Input data of the portable electronic device 17 is shown in the left side of FIG. 3, and output data of the portable electronic device 17 is shown in the right side of FIG. 3. Arrows shown in FIG. 3 represent flow of data.

An image information indicating a situation of an object requiring the turnout, positional information on the object requiring the turnout or information (for example, a telephone number) from which the positional information is obtainable, and a name of the object, and a notification of occurrence of the abnormality are provided from the information providing apparatus 34 to the portable electronic device 17 through the network 32 and the base station 35-1.

Based on such information, the user 1 requests an organization to request for turnout (for example, the police, a fire station, and an ambulance, etc.) for turnout using the portable electronic device 17. In addition, for example, the portable electronic device 17 generates an ID information of the person who requests for turnout and provides the ID information to the organization to request for turnout.

Figure 4:
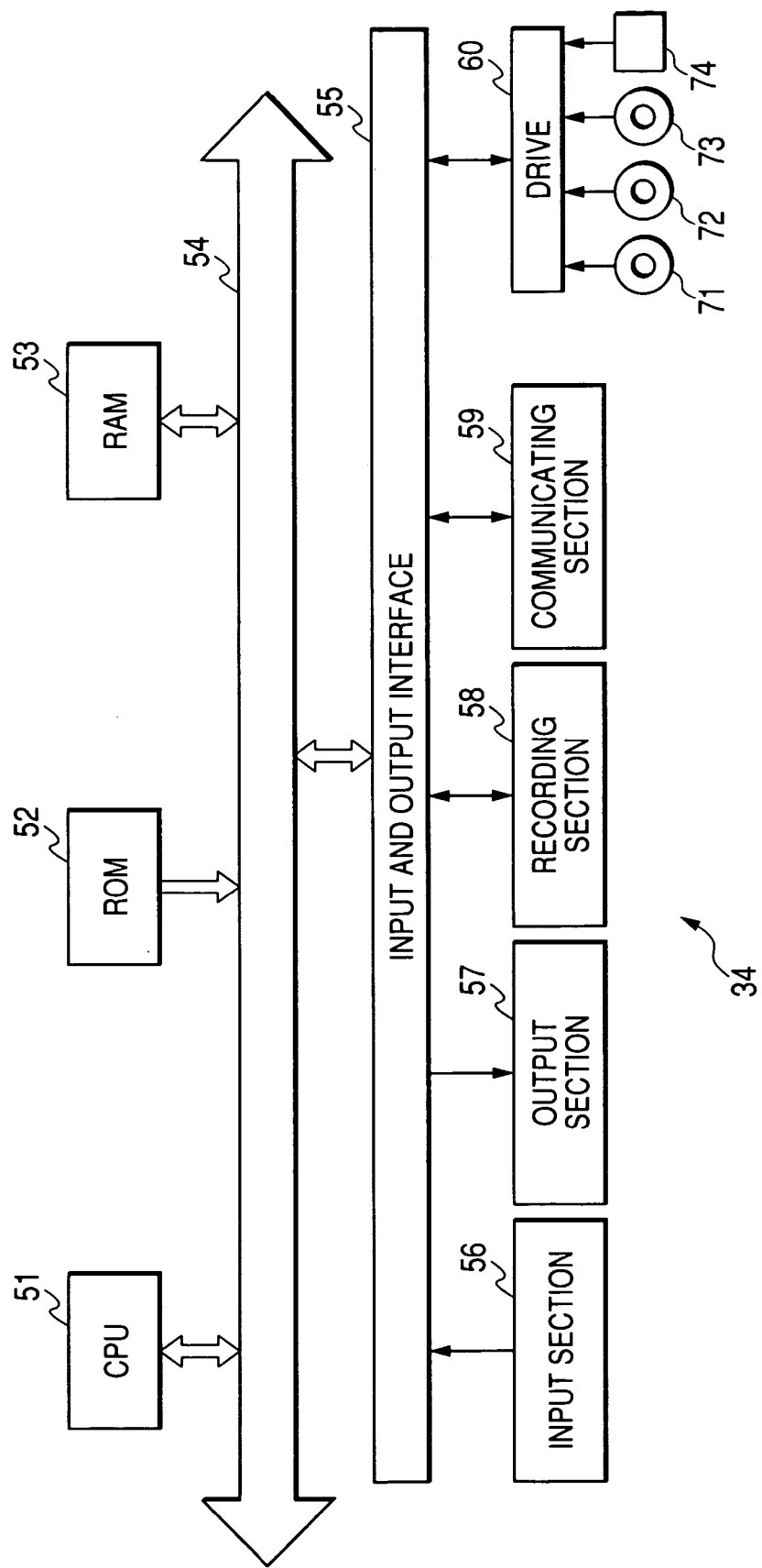
FIG. 4 is a block diagram showing a configuration of an information providing apparatus.

FIG. 4 is a block diagram showing a configuration of an information providing apparatus 34 according to one embodiment of the present invention.

The information providing apparatus 34 is configured, for example, as shown in FIG. 4. A CPU (Central Processing Unit) 51 performs various processes in accordance with a program recorded in ROM (Read Only Memory) 52 or a recording section 58. The program executed by the CPU 51 and data are adequately stored in RAM (Random Access Memory) 53. The CPU 51, the ROM 52 and the RAM 53 are interconnected via a bus 54.

An input and output interface 55 is connected to the CPU 51 via the bus 54. The input and output interface 55 is connected to an input section 56 including a keyboard, a mouse, a microphone, etc. and an output section 57 including a display, a speaker, etc. The CPU 51 performs various processes in response to instructions input from the input section 56. The CPU 51 outputs images or voices obtained as a result of the processes to the output section 57.

The recording section 58 connected to the input and output interface 55 is configured with, for example, a hard disk and the like, and records programs executed by the CPU 51 and various kinds of data. A communication section 59 communicates with external devices through Internet, other networks or communication media.

In addition, the programs may be acquired through the communication section 59 and recorded in the recording section 58.

A drive 60 connected to the input and output interface 55 drives a magnetic disk 71, an optical disk 72, an optical magnetic disk 73, or a semiconductor memory 74, etc., when they are loaded to the drive 60, and acquires programs or data recorded in the disk or the memory. The acquired programs or data are transmitted to and recorded in the recording section 58 if necessary.

The portable electronic device 17 has the same configuration as the information providing apparatus 34, and therefore, explanation thereof will be omitted.

Figure 5:
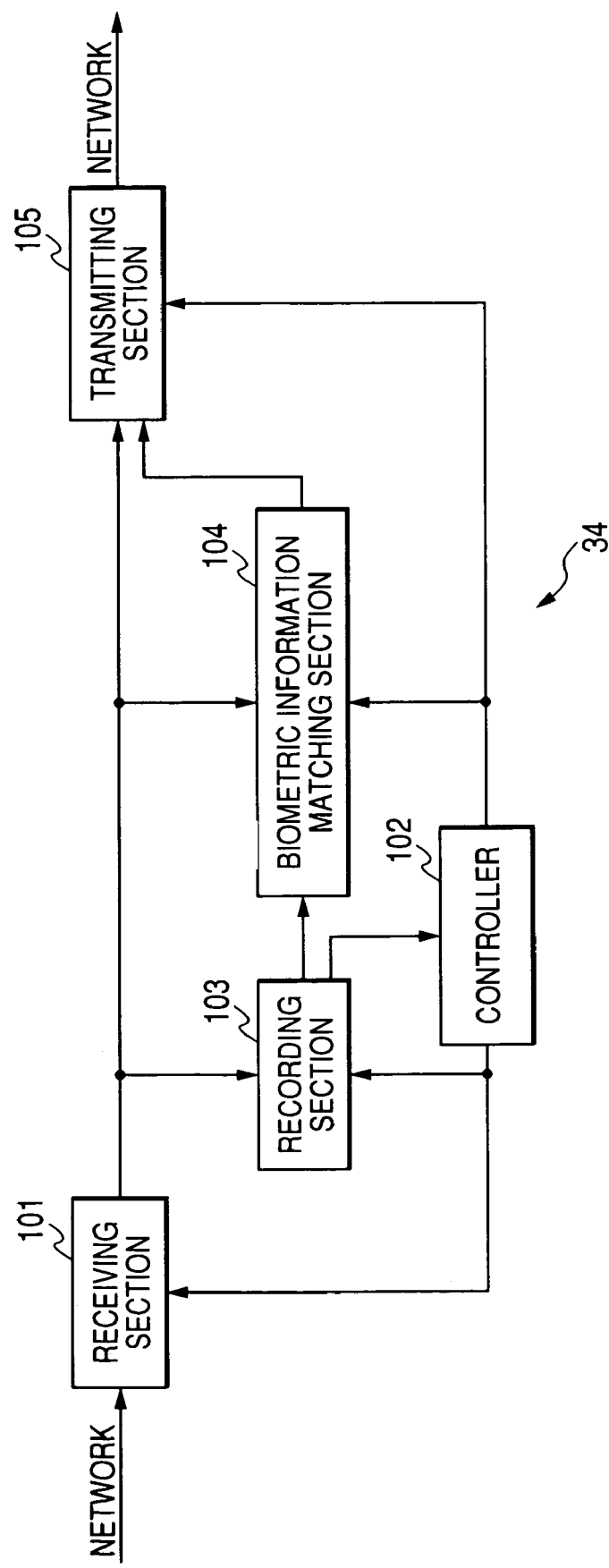
FIG. 5 is a block diagram showing a functional configuration of an information providing apparatus according to an embodiment of the present invention.

FIG. 5 is a block diagram showing a functional configuration of the information providing apparatus 34 according to one embodiment of the present invention.

A receiving section 101 corresponds to the communication section 59, and receives a notification of abnormality provided from the server 33 through the network 32, and a voice data provided by the portable electronic device 17 through the network 32 and the base station 35, etc. The receiving section 101 provides the received data to a recording section 103, a biometric information matching section 104, or a transmitting section 105.

A controller 102 corresponds to the CPU 51 executing control programs, and controls whole of the information providing apparatus 34. That is, the controller 102 controls the receiving section 101, the recording section 103, the biometric information matching section 104, and the transmitting section 105.

The recording section 103 corresponds to the recording section 58, which is configured, for example, with the hard disk, etc., and records various kinds of data under a control of the controller 102.

For example, the recording section 103 stores and records the voice data provided from the portable electronic device 17 in a file.

The recording section 103 provides the recorded data to the biometric information matching section 104 under the control of the controller 102.

For example, the recording section 103 records data generated when abnormality occurs and transmitted from the server 33. In addition, the recording section 103 records, in advance, matching data used to match in a biometric information matching process of the biometric information matching section 104, which will be described later.

The matching data are recorded in the recording section 103 by registering in the recording section 103 in advance.

The biometric information matching section 104 performs the biometric information matching process based on the received data which is a biometric information provided from the receiving section 101 and the matching data provided from the recording section 103 under the control of the controller 102. Then, the biometric information matching section 104 provides data indicating a result of the matching (matching result data) to the transmitting section 105.

Here, the biometric information matching process refers to a process of identifying the user 1, using information unique to individuals such as physical features or characteristics, which is a so-called biometric identification. For example, the biometric information matching process is performed by determining whether or not the received data (for example, image data of a face of the user 1) provided from the receiving section 101 is included in the information (for example, pre-registered image data of the face of the user 1) of the matching data in the recording section 103.

In addition, a type of the biometric identification is not limited to this example. For example, a fingerprint, a vein of the back of the hand, an iris, a voice, etc. may be used as the physical features or characteristics. In addition, for example, the user 1 may be another person (for example, a spouse, parents, or children, etc.) having some connection with the user 1.

The transmitting section 105 corresponds to the communication section 59, and provides transmission data, which are generated based on the received data provided by the receiving section 101 or the matching result data indicating the result of the matching provided by the biometric information matching section 104, to the portable electronic device 17 through the base station 35 and the network 32.

In this way, the information providing apparatus 34 generates the transmission data based on the received data from the receiving section 101, and provides the transmission data to the portable electronic device 17. In addition, the information providing apparatus 34 records data corresponding to the data provided to the portable electronic device 17.

Figure 6:
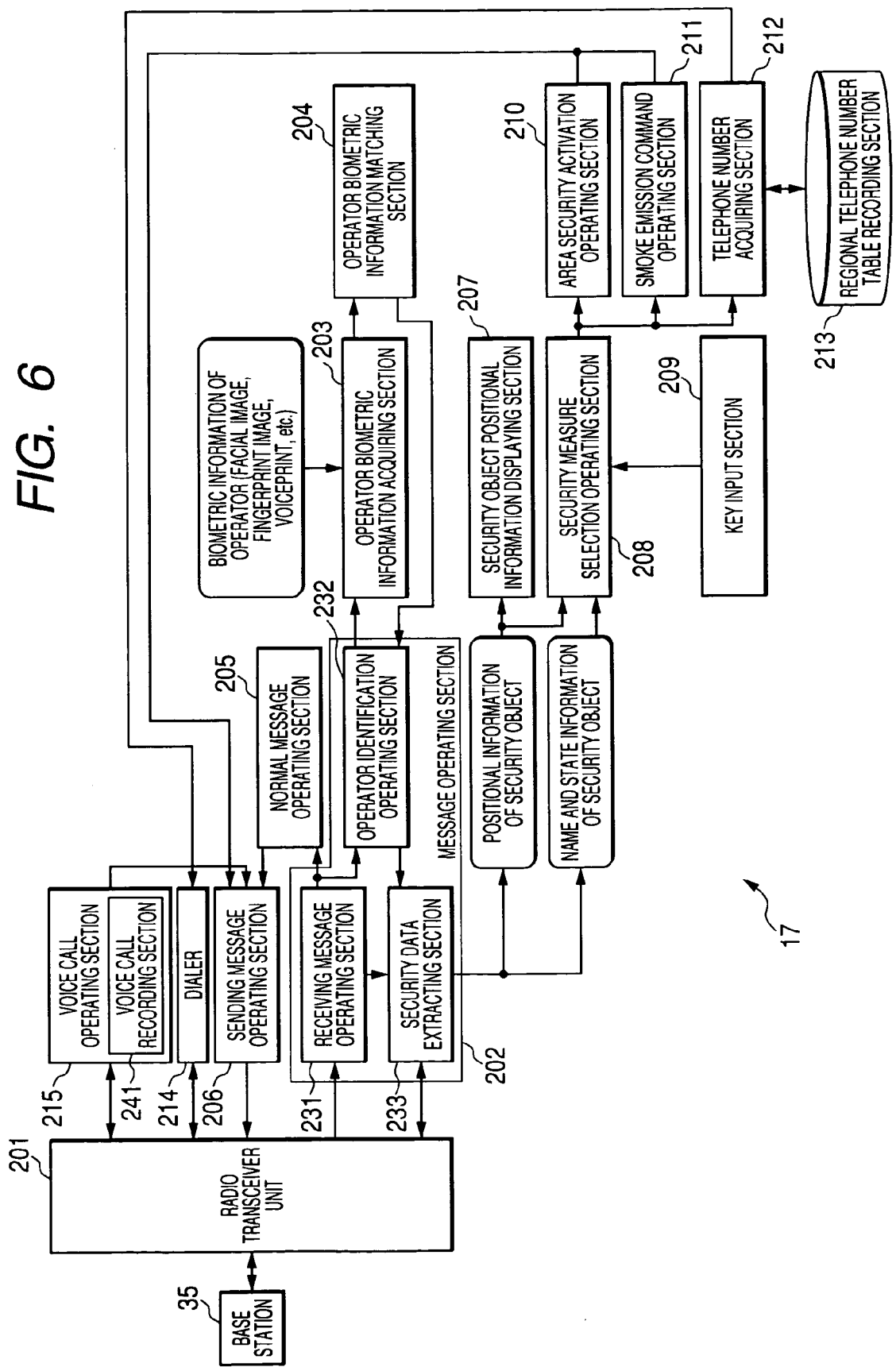
FIG. 6 is a block diagram showing a functional configuration of a portable electronic device according to an embodiment of the present invention.

FIG. 6 is a block diagram showing a functional configuration of the portable electronic device 17 according to one embodiment of the present invention.

A radio transceiver unit 201 receives various kinds of data or receiving messages, and provides the received data or receiving messages to a message operating section 202, a dialer 214, and a voice call operating section 215. For example, the radio transceiver unit 201 receives header information of a mail which is a receiving message, and provides the header information of the received mail to the message operating section 202.

Based on the header information included in the receiving message provided by the radio transceiver unit 201, the message operating section 202 distributes the receiving message (for example, an electronic mail) provided by the radio transceiver unit 201, trespass-related data included in the receiving message, or an identification data, etc., to an operator biometric information acquiring section 203, a normal message operating section 205, a security object positional information displaying section 207, and a security measure selection operating section 208.

Here, the identification data refers to information used to perform a biometric identification (for example, image data of a face of a person), which will be described later.

In addition, the message operating section 202 is implemented by a resident program, and can reliably receive receiving messages sent to the radio transceiver unit 201 by the resident program. In this way, when a behavior endangering or possibly endangering safety of property, possessions or loan of the user 1, or safety of a person having some connection with the user 1 occurs, the behavior can be reliably known by the user 1.

The message operating section 202 includes a receiving message operating section 231, an operator identification operating section 232, and a security data extracting section 233.

Based on the header information of the receiving message provided by the radio transceiver unit 201, the receiving message operating section 231 distributes the header information of the receiving message or the matching result data included in the receiving message to the normal message operating section 205, the security data extracting section 233 and the operator identification operating section 232, respectively.

More specifically, the receiving message operating section 231 provides header information of a normal receiving message (a normal electronic mail and the like) to the normal message operating section 205. The receiving message operating section 231 provides the header information of the receiving message of the trespass-related data to the operator identification operating section 232 and the security data extracting section 233. In addition, the receiving message operating section 231 provides the matching result data included in the receiving message to the operator identification operating section 232.

When the header information of the receiving message of the trespass-related data is provided by the receiving message operating section 231, the operator identification operating section 232 instructs the operator biometric information acquiring section 203 to acquire biometric information of an operator.

The operator biometric information acquiring section 203 acquires the biometric information of the operator (for example, a facial image, a fingerprint image, or a voiceprint, etc.), and provides the acquired biometric information to the operator biometric information matching section 204.

Based on the biometric information provided by the operator biometric information acquiring section 203 and the identification data, the operator biometric information matching section 204 performs the biometric information matching process to generate the matching result data indicating a result of the matching, and provides the generated matching result data to the operator identification operating section 232.

Here, the biometric information matching process refers to a process of identifying the user 1 by using information unique to individuals such as physical features or characteristics, which is a so-called biometric identification. For example, the biometric information matching process is performed by determining whether or not the biometric information (image data of the face of the user 1) provided by the operator biometric information acquiring section 203 is included in the pre-registered data (pre-registered image data of the face of the user 1).

In addition, a type of the biometric identification is not limited to this example. For example, a fingerprint, a vein of the back of the hand, an iris, a voice, etc. may be used as the physical features or characteristics. In addition, for example, the user 1 may be another person having some connection with the user 1.

In addition, although the matching process is performed by the operator biometric information matching section 204 in this example, the biometric information matching section 104 of the information providing apparatus 34 may perform the matching process. In the case where the biometric information matching section 104 of the information providing apparatus 34 performs the matching process, details of the portable electronic device 17 will be described later with reference to FIG. 18.

Based on the matching result data provided from the operator biometric information matching section 204, the operator identification operating section 232 identifies the operator, and provides an identification result signal indicating a result of the identification, which will be described later, to the security data extracting section 233.

When the identification result signal provided from the operator identification operating section 232 indicates that the operator is an authorized person, the security data extracting section 233 acquires the trespass-related data based on the header information of the receiving message provided by the receiving message operating section 231 and the identification result signal provided from the operator identification operating section 232.

In this case, the security data extracting section 233 makes the radio transceiver unit 201 to acquire the trespass-related data from the information providing apparatus 34.

Now, a procedure where the security data extracting section 233 acquires a text of the receiving message based on the header information of the receiving message will be described.

The security data extracting section 233 extracts an abnormal number specifying the trespass-related data included in the header information of the receiving message, and provides the extracted abnormal number to the radio transceiver unit 201.

The security data extracting section 233 makes the radio transceiver unit 201 to send a message for a send request of the trespass-related data along with the abnormal signal to the information providing apparatus 34 through the network 32 and the base station 35. When the information providing apparatus 34 receives the message for the send request of the trespass-related data, since the trespass-related data specified by the abnormal number is sent to the portable electronic device 17 through the network 32 and the base station 35, the radio transceiver unit 201 receives the trespass-related data.

The radio transceiver unit 201 provides the received trespass-related data to the security data extracting section 233.

In this way, the security data extracting section 233 acquires the trespass-related data.

Next, the security data extracting section 233 extracts a positional information specifying a place where the trespass behavior occurs, that is, a positional information of a security object, a name of property or the like on which a trespass is made, i.e., a name of the security object, and a state information indicating contents of the trespass behavior, all of which are included in the trespass-related data provided by the radio transceiver unit 201. The security data extracting section 233 provides the extracted positional information of the security object to the security object positional information displaying section 207, and provides the name and the state information of the security object to the security measure selection operating section 208.

Based on the header information of the receiving message provided from the receiving message operating section 231, the normal message operating section 205 requests the sending message operating section 206 for a send request of a normal message corresponding to the header information.

Based on a request from the normal message operating section 205, the sending message operating section 206 sends a message requesting sending of the normal message to the radio transceiver unit 201.

In addition, based on data provided from an area security activation operating section 210, a smoke emission command operating section 211, or a voice call recording section 241 of the voice call operating section 215, the sending message operating section 206 generates a message and sends the generated message to the radio transceiver unit 201. This will be described later.

Next, based on the positional information of the security object provided from the security data extracting section 233, the security object positional information displaying section 207 displays the positional information of the security object, i.e., the positional information specifying the place where the trespass behavior occurs, on the screen of the portable electronic device 17.

The positional information may include, for example, an address of a place of property, possessions, or loan on which a trespass is made, or an address of a place where they are being used, or a telephone number specifying an address (for example, a fixed telephone number), etc.

Based on the positional information displayed on the screen of the portable electronic device 17, the user 1 can accurately know a position of the property, possessions, or loan on which the trespass is made, etc. In addition, for example, the user 1 can quickly and accurately notify the police of the address or telephone number of the place where the trespass behavior occurs while looking at the positional information displayed on the screen of the portable electronic device 17.

In other words, although there may be a case where a confused user unskillfully notifies the police of a situation, the user 1 can accurately and quickly notify the police of information required for the police to go into action since the user 1 can look at the positional information displayed on the screen of the portable electronic device 17 even when the user 1 is confused.

Based on the positional information of the security object, and the name and the state information of the security object, which are provided from the security data extracting section 233, the security measure selection operating section 208 displays the name and the state information of the security object, along with measure menus for selecting various processes, on the screen of the portable electronic device 17.

In addition, based on an operating signal provided from a key input section 209, the security measure selection operating section 208 makes the area security activation operating section 210, the smoke emission command operating section 211, or a telephone number aquiring section 212 to perform respective processes.

The key input section 209 corresponds to the input section 56 of the portable electronic device 17, and is operated by the user 1, for example, when the user 1 selects one of the measure menus displayed on the screen of the portable electronic device 17, etc.

When keys of the portable electronic device 17 assigned respectively to the measure menus displayed on the screen of the portable electronic device 17 are pushed, the key input section 209 provides the operating signal corresponding to each of the assigned keys to the security measure selection operating section 208.

For example, when a measure menu "police turnout request" displayed on the screen of the portable electronic device 17 is selected by a cursor and a OK button is pushed, the key input section 209 provides an operating signal corresponding to "police turnout request" to the security measure selection operating section 208.

In addition, for example, assuming that a number key "1" of the portable electronic device 17 is assigned to the measure menu "police turnout request" displayed on the screen of the portable electronic device 17, when the number key "1" of the portable electronic device 17 is pushed, the key input section 209 may provide the operating signal corresponding to "police turnout request" to the security measure selection operating section 208.

Under the control of the security measure selection operating section 208, the area security activation operating section 210 generates a trigger (activation data) to activate a security device such as a buzzer or a siren, installed at the place where the trespass behavior occurs, and provides the generated trigger to the sending message operating section 206.

In addition, based on a smoke emission command control signal provided from the security measure selection operating section 208, the smoke emission command operating section 211 generates a trigger for smoke emission to a smoke emitter installed in the place where the trespass behavior occurs, and provides the generated trigger to the sending message operating section 206.

The sending message operating section 206 generates a message for sending the trigger provided from the area security activation operating section 210 or the smoke emission command operating section 211, and provides the generated message to the radio transceiver unit 201. The radio transceiver unit 201 sends a message including the trigger for activating the security device or the smoke emitter to the security device or the smoke emitter through the base station 35 and the network 32.

When the security device or the smoke emitter receives the message including the trigger for activating the security device or the smoke emitter, which is sent from the portable electronic device 17 through the base station 35 and the network 32, the security device generates a loud warning sound or the smoke emitter emits a white smoke, for example.

In this way, based on the state information indicating the contents of the trespass behavior such as an image of a trespasser, which is displayed on the screen of the portable electronic device 17, an appropriate security device can be selected and operated remotely for protection. Accordingly, the property, possessions, or loan of the user can be protected from the trespass behavior by alarming an illegal trespasser.

When the measure menu "police turnout request" is selected, based on an instruction from the security measure selection operating section 208, a telephone number acquiring section 212 reads a telephone number of the telephone redirecting device 18 that is closest to a place where the trespass behavior occurs, i.e., a security object on which a trespass is made, from a regional telephone number table recording section 213, and provides the read telephone number to the dialer 214.

The regional telephone number table recording section 213 records telephone numbers of the telephone redirecting devices 18 for each region.

For example, since the regional telephone number table recording section 213 records telephone numbers of the telephone redirecting devices 18 installed at specified regions throughout the country, when the police is requested for turnout from the portable electronic device 17, the user 1 can request the police closest to the security object to go into action no matter where the user 1 stays in the country.

In addition, although the area security activation operating section 210, the smoke emission command operating section 211, and the telephone number acquiring section 212 are described as examples of a measure menu operating section, the measure menu operating section is not limited to the area security activation operating section 210, the smoke emission command operating section 211, and the telephone number acquiring section 212.

For example, the measure menu operating section may include an operating section for operating a light illuminating device, a device in which flashlights flicker continuously, or a device that generates an alarming voice such as "I've requested the police to go into action", a sound of a police patrol car, or a bark of a dog, or a device that sprays a color marker.

Based on the telephone number provided from the telephone number acquiring section 212, the dialer 214 is connected to a predetermined one of the telephone redirecting devices 18-1 to 18-J.

The voice call operating section 215 performs a calling process between the user 1 and the other person by, for example, performing an encoding or decoding process of voice data of the call.

The voice call operating section 215 includes the voice call recording section 241.

The voice call recording section 241 records call contents of the voice call operating section 215, i.e., the voice data of the call (conversation). The voice call recording section 241 provides the recorded voice data of the call to the sending message operating section 206.

In this way, based on the trespass-related data, the portable electronic device 17 displays the information indicating the place where the trespass behavior occurs. Accordingly, the user 1 can precisely and quickly send a notification to the police, the fire station or the like, while looking at the information indicating the place where the trespass behavior occurs displayed on the screen of the portable electronic device 17.

In addition, when the portable electronic device 17 performs the biometric identification process before displaying the information indicating the place where the trespass behavior occurs, and it is determined that the user 1 is an authorized person, the positional information, the image and the measure menus, etc. are displayed on the screen. Accordingly, mischief or incorrect notification by an unauthorized person can be prevented.

Figure 7:
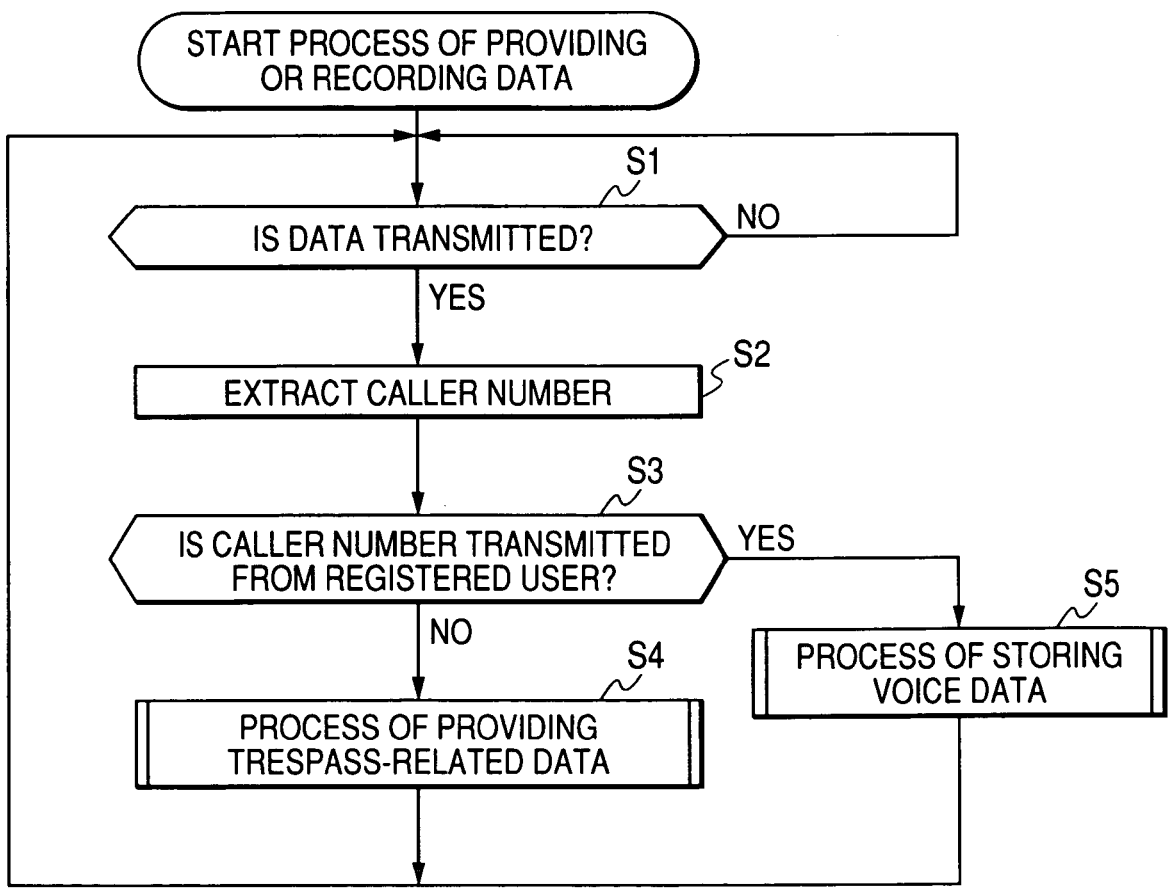
FIG. 7 is a flow chart illustrating a process of providing or recording data.

FIG. 7 is a flow chart illustrating a process of providing or recording data in the information providing apparatus 34 having the configuration shown in FIG. 5.

In Step S1, the controller 102 determines whether or not the data is transmitted through the network 32. For example, in Step S1, based on signals provided from the receiving section 101 performing a connecting process before the data transmission is started, the controller 102 determines whether or not the data is transmitted from the receiving section 101.

In Step S1, if it is determined that the data is not transmitted, the process returns to Step S1, and the determination process is repeated until the data is transmitted.

In Step S2, the controller 102 extracts a caller number from a connection control data provided by the receiving section 101, which is acquired by the receiving section 101 in a connection process the caller. Here, the caller number is, for example, a telephone number or the like of the portable electronic device 17, a portable telephone, which is sent by a call process.

In Step S3, based on the caller number extracted in the process of Step S2, the controller 102 determines whether the data is transmitted or not from a registered user 1. For example, in Step S3, based on whether the extracted caller number is recorded or not in a telephone number correspondence table, which will be described, the controller 102 determines whether the data is transmitted or not from the registered user 1.

If it is determined in Step S3 that the data is not transmitted from the registered user 1, that is, the data is transmitted from one of the servers 33-1 to 33-M, the controller 102 performs a process of providing the trespass-related data in Step S4. Then, the above processes are repeated, restarting from Step S1. Details of the process of providing the trespass-related data will be described later.

On the other hand, if it is determined in Step S3 that the data is transmitted from a user whose caller number is extracted, i.e., the registered user 1, since the transmitted data includes voice data of a call for notification, the controller 102 performs a voice data storing process in Step S5. Then, the above processes are repeated, restarting from Step S1. Details of the voice data storing process will be described later.

In addition, the caller number is not limited to the telephone number and may be an IP (Internet Protocol) address, an URL (Uniform Resource Locator) or the like. In this case, for example, the caller number such as the telephone number, the IP address, or the URL is extracted in Step S2. Then, depending on whether the caller number matches or not to a telephone number, an IP address, or an URL, registered in advance, it is determined in Step S3 whether the data is transmitted or not from the registered user 1.

Figure 8:
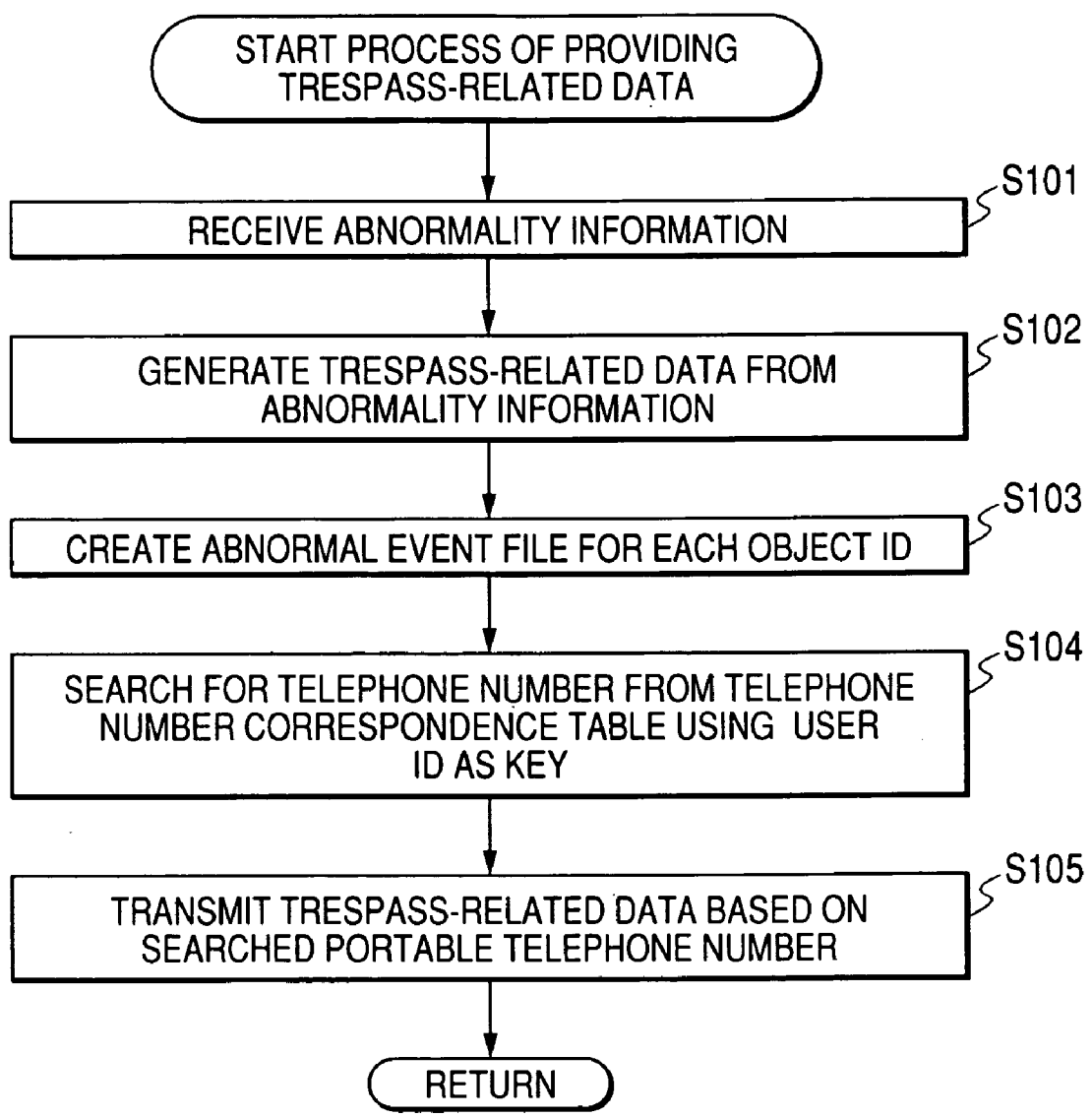
FIG. 8 is a flow chart illustrating a process of providing trespass-related data.

Next, the details of the process of providing the trespass-related data corresponding to the process of Step S4 will be described with reference to a flow chart of FIG. 8.

In Step S101, the receiving section 101 receives abnormality information sent from the servers 33-1 to 33-M through the network 32, and provides the received abnormality information to the controller 102. The abnormality information sent from the servers 33-1 to 33-M includes a user ID specifying the user 1 and an object ID (which may be an ID specifying the detecting devices 31-1 to 31-N) specifying an object on which a trespass is made.

In Step S102, based on the received abnormality information, the controller 102 generates the trespass-related data and provides the generated trespass-related data to the recording section 103.

In Step S103, the controller 102 creates an abnormal event file in which the trespass-related data is stored, which is a file for each object ID included in the received data, and records the created abnormal event file in the recording section 103. In this case, for example, a file name of the abnormal event file includes an abnormal number.

In Step S104, the controller 102 searches for the telephone number of the portable electronic device 17, which is a portable telephone of the user 1, from the telephone number correspondence table recorded in the recording section 103, using the user ID included in the received data as a key, and reads out the searched telephone number.

FIG. 9 is a diagram showing an exemplary telephone number correspondence table.

In the exemplary telephone number correspondence table shown in FIG. 9, a first row represents items and the subsequent rows represent each data of each user 1. In addition, first to third columns represent "user ID", "telephone number", and "electronic mail address", respectively. That is, the telephone number of the portable electronic device 17, which is the portable telephone of the user 1, and the electronic mail address of the user 1 are stored in the telephone number correspondence table, in correspondence to the user ID, which is the information specifying the user 1.

For example, a telephone number of "090-1111-1111" and an electronic mail address of "aaaaa@xxxxx.ne.jp" are recorded for a user ID of "00000001". Also, a telephone number of "090-2222-2222" and an electronic mail address of "bbbbb@xxxxx.ne.jp" are recorded for a user ID of "00000002". In addition, a telephone number of "090-3333-3333" and an electronic mail address of "ccccc@xxxxx.ne.jp" are recorded for a user ID of "00000003".

For example, when the user ID included in the abnormality information is "00000001", the controller 102 searches for and reads the telephone number of "090-1111-1111" recorded in correspondence to the user ID of "00000001" from the telephone number correspondence table of the recording section 103.

In Step S105, based on the telephone number searched for and read in the process of Step S4, the controller 102 instructs the transmitting section 105 to send the trespass-related data generated in Step S102 to the portable electronic device 17 through the network 32 and the base station 35. Then, the process is terminated.

For example, the transmitting section 105 transmits the trespass-related data to the portable electronic device 17 having a portable telephone number of "090-1111-1111".

In this way, the information providing apparatus 34 can generate the trespass-related data from the abnormal signal provided by the server 33 through the network 32, and send the trespass-related data to the portable electronic device 17 having a registered telephone number through the network 32 and the base station 35.

As will be described later, when a situation occurs where a trespass is made on the property and the like of the user 1, the portable electronic device 17 receiving the trespass-related data transmitted from the information providing apparatus 34 notifies the user 1 that a trespass is made on the property and the like of the user 1.

That is, when an emergency occurs, the user 1 is notified by the portable electronic device 17.

Figure 10:
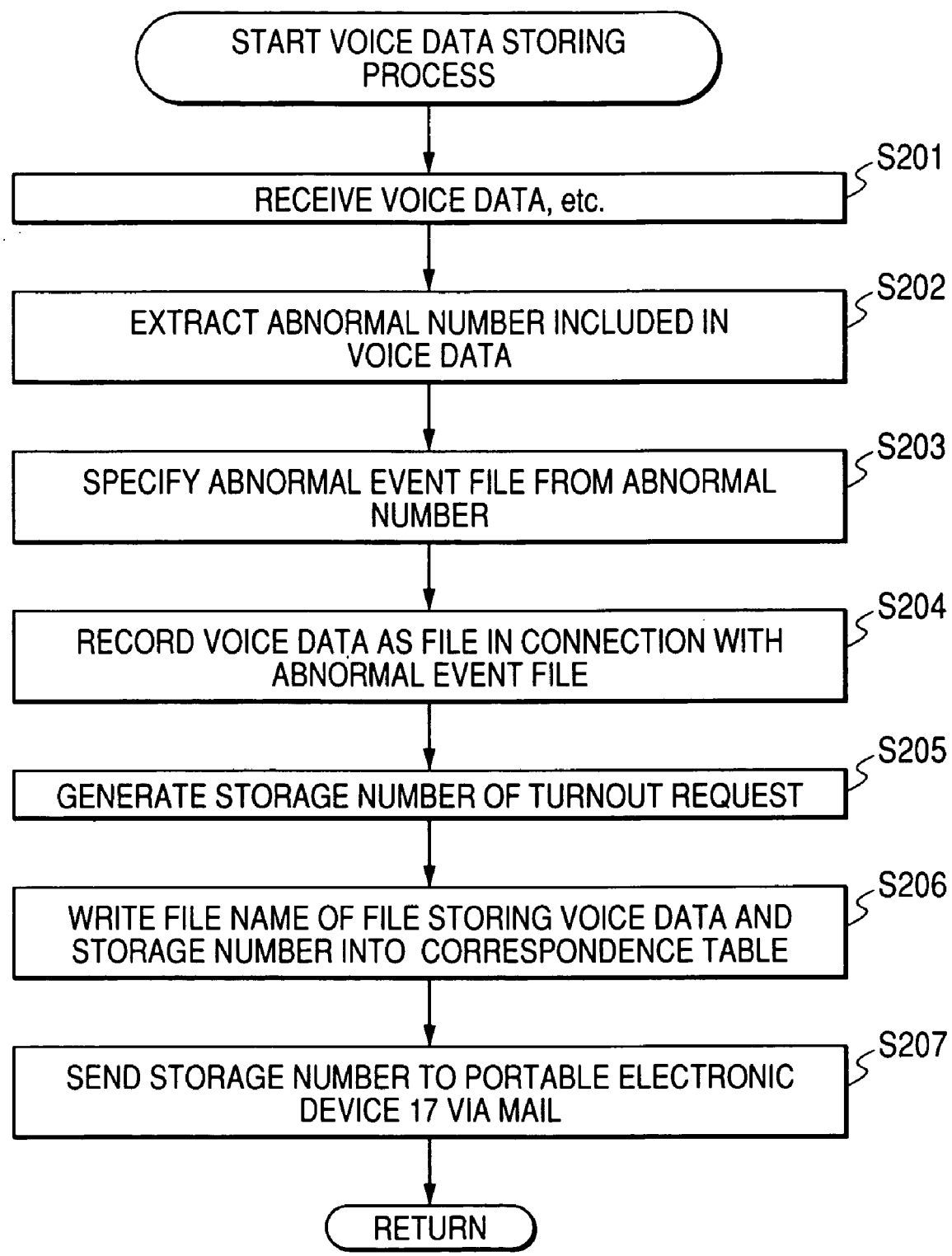
FIG. 10 is a flow chart illustrating a process of voice data storage.

Next, details of the process of the voice data storing process corresponding to the process of Step S5 will be described with reference to a flow chart of FIG. 10.

In Step S201, the controller 102 makes the receiving section 101 to receive the voice data sent from the portable electronic device 17 through the base station 35 and the network 32, and to provide the received voice data to the recording section 103. The abnormal number is included in the voice data sent from the portable electronic device 17.

In Step S202, the controller 102 acquires the voice data received from the receiving section 101, and extracts the abnormal number included in the voice data.

In Step 203, based on the abnormal number, the controller 102 specifies the abnormal event file recorded in the recording section 103 in the process of Step S103. For example, since the file name of the abnormal event file includes the abnormal number, the controller 102 specifies the abnormal event file by searching for a file having file name including the abnormal number.

In Step S204, the controller 102 makes the recording section 103 to record the voice data as a file in connection with the abnormal event file. For example, in Step S204, the controller 102 makes the recording section 103 to record the voice data as a file in connection with the abnormal event file by storing the voice data in a file of which file name includes the file name of the abnormal event file. More specifically, for example, a file name of a file storing the voice data may be a file name that differs from the file name of the abnormal event file only in an extension name.

Furthermore, for example, in addition to the voice data corresponding to the conversation with the police or the fire station, etc., the time information indicating the time of notification, or image data, voice data or sensor data referenced in the conversation may be stored in the file of the voice data. The recording section 103 records a file for storing the voice data having, of which file name is "eeeee", for example.

In Step S205, the controller 102 generates a storage number of a turnout request specifying the behavior of notification, and provides the generated storage number to the recording section 103.

The controller 102 generates, for example, a storage number of a turnout request which is "zzzzzz", and provides the storage number of the turnout request, "zzzzzz", to the recording section 103.

In Step S206, the controller 102 makes the recording section 103 to write the file name of the file recorded in the process of Step S204 and the storage number generated in the process of Step S205 into a correspondence table, with a correspondence between the file name and the storage number.

For example, the recording section 103 writes the file name of "AAAAA" and the storage number of "zzzzzz" into the correspondence table.

FIG. 11 is a diagram showing an example of the corresponding table.

In the example of the correspondence table shown in FIG. 11, a first row represents items and the subsequent rows represents data. In addition, a first column represents a "storage number" and a second column represents "file name of a file in which data from a user is stored."

For example, the storage number of "zzzzzz" and the file name of "AAAAA" of the file in which the data from the user 1 is stored are stored in the correspondence table shown in FIG. 11, with a correspondence between the file name and the storage number. Also, the storage number of "yyyyyy" and the file name of "BBBBB" of the file in which the data from the user 1 is stored are stored in the correspondence table shown in FIG. 11, with a correspondence between the file name and the storage number. In addition, the storage number of "xxxxxx" and the file name of "CCCCC" of the file in which the data from the user 1 is stored are stored in the correspondence table shown in FIG. 11, with a correspondence between the file name and the storage number.

In Step S207, the controller 102 makes the transmitting section 105 to send the storage number generated in the process of Step S205 to the portable electronic device 17 via an electronic mail. Then, the procedure is terminated.

In this way, the user 1 can confirm the storage of data with the mail sent to the portable electronic device 17. In addition, since the storage number is included in the mail, the user 1 can specify the voice file based on the storage number. In addition, since the voice file is associated with the abnormal event file, the user 1 can specify the abnormal event file in which the trespass-related data used in the notification is stored, and in which the voice data is recorded in the voice file.

Figure 12:
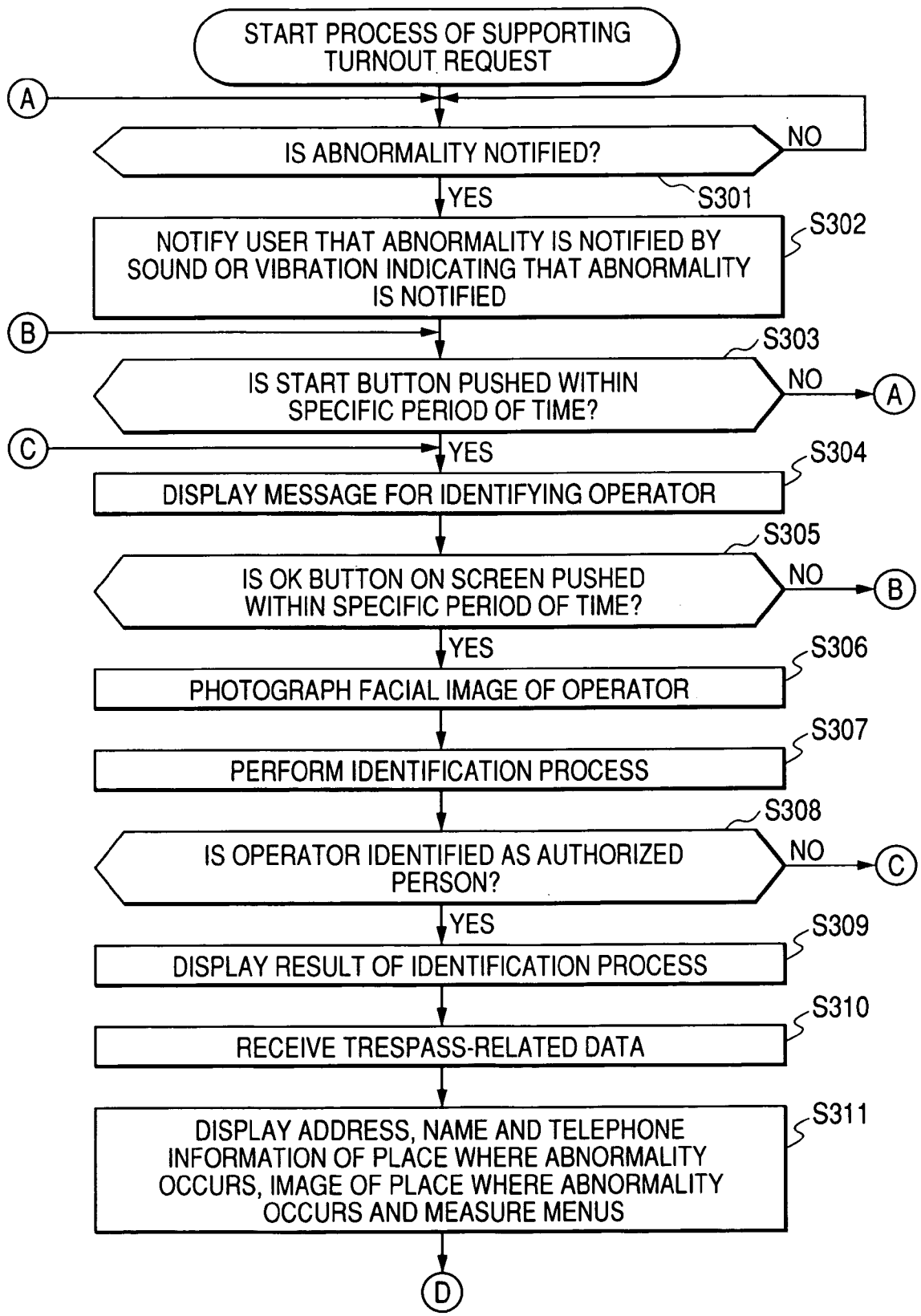
FIG. 12 is a flow chart illustrating a process of turnout request support.
Figure 13:
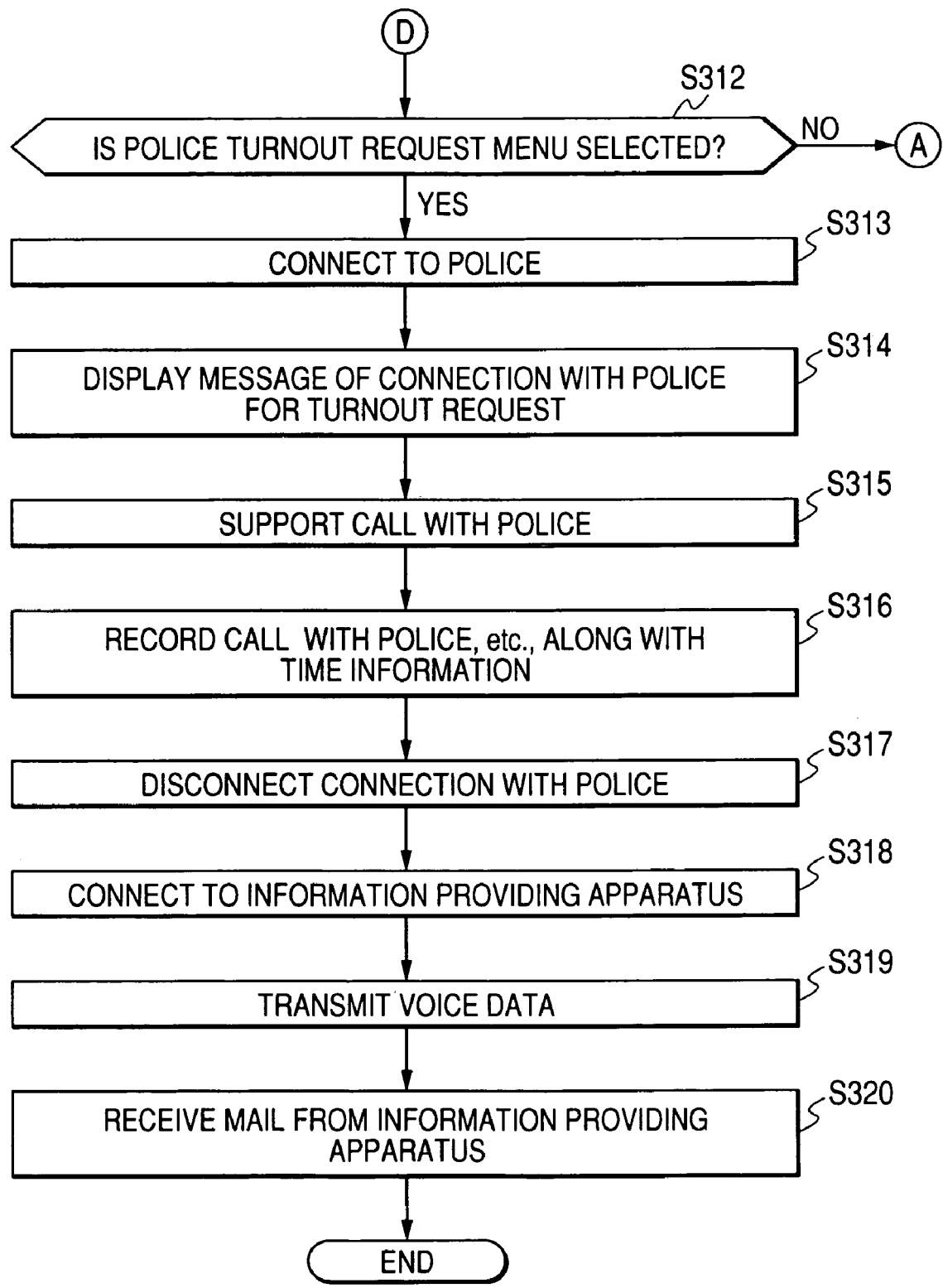
FIG. 13 is a flow chart illustrating a process of turnout request support.

FIGS. 12 and 13 are flow charts illustrating a process of supporting the turnout request by the portable electronic device 17 having the configuration shown in FIG. 6.

In Step S301, based on the header information included in the trespass-related data provided from the radio transceiver unit 201, the receiving message operating section 231 determines whether an abnormality is notified or not from the information providing apparatus 34.

If it is determined in Step S301 that the abnormality is not notified, the radio transceiver unit 201 repeats the determination process in Step S301 until the abnormality is notified. That is, the portable electronic device 17 performs a normal process until the radio transceiver unit 201 receives the trespass-related data.

If it is determined in Step S301 that the abnormality is notified, the procedure proceeds to Step S302, and the receiving message operating section 231 notifies the user 1 (operator) of the portable electronic device 17 that the abnormality is notified through a sound, vibration or the like indicating that the abnormality is notified.

The sound indicating that the abnormality is notified may be a so-called ring alert of the portable electronic device 17, which is the portable telephone. In this case, only when the abnormality is notified, the portable electronic device 17 gives out a special ring alert that is different from a normal ring alert by a function incorporated in the portable electronic device 17. In this way, since the user 1 can distinguish a ring alert of a normal telephone call or e-mail from a ring alert indicating that the abnormality is notified, for example, the user 1 can quickly know that the abnormality is notified.

For example, the ring alert indicating that the abnormality is notified may be a special ring alert set as a default or may be selected by the user 1 by setup.

In Step S303, the receiving message operating section 231 determines whether a start button is pushed or not within a specific period of time after the process of Step S302 is initiated. By determining whether the start button is pushed or not within the specific period of time, the receiving message operating section 231 can know whether or not the user 1 recognizes the notification of the abnormality. In addition, by determining whether the start button is pushed or not within the specific period of time, a lowering of the amount of stored power in a battery due to continuous generation of the ring alert and the like (so-called battery run-out) can be avoided.

In addition, for example, when the abnormality is notified, the start button may be displayed on the screen of the portable electronic device 17 or equipped in the portable electronic device 17.

In Step S303, if the start button is not pushed, the procedure returns to Step S301 and the process is repeated again until the radio transceiver unit 201 receives the trespass-related data. That is, the portable electronic device 17 performs the normal process until the radio transceiver unit 201 receives the trespass-related data.

In Step S303, if the start button is pushed, the procedure proceeds to Step S304 and the operator identification operating section 232 makes the output section 57 of the portable electronic device 17 to display a message for identifying the user 1.

Figure 14:
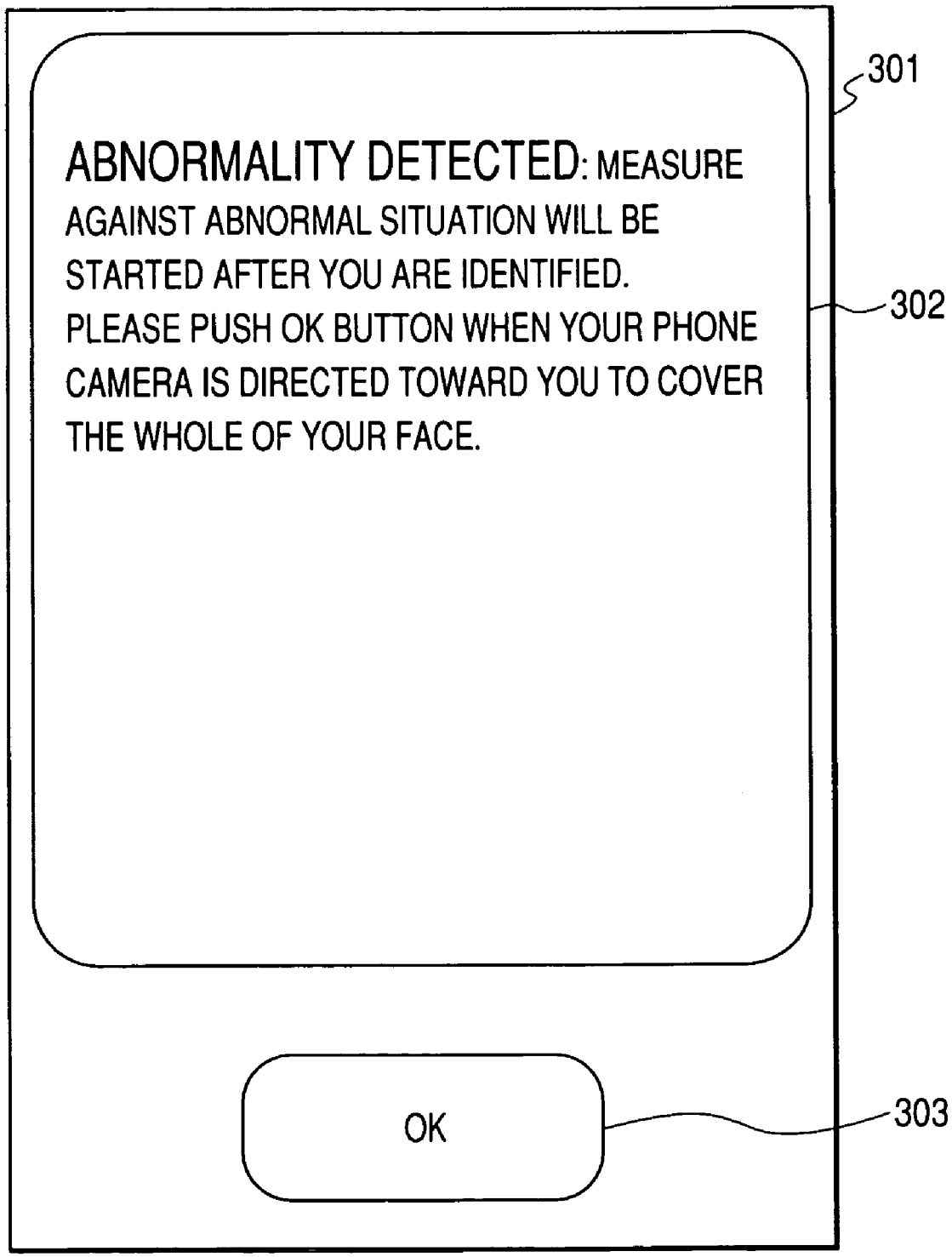
FIG. 14 is a diagram showing an example of a screen of a portable electronic device.

FIG. 14 is a diagram showing an example of the message for identifying the user.

FIG. 14 shows an enlarged screen of the output section 57 as a display of the portable electronic device 17. A message 302 such as "Abnormality detected: A measure against abnormal situation will be started after you are identified. Therefore, please push an OK button when your phone camera is directed toward you to cover the whole of your face.", for example, and an OK button 303 are displayed on a screen 301 of the output section 57.

In Step S305, the operator identification operating section 232 determines whether the OK button 303 on the screen is pushed or not within a specified period of time.

If it is determined in Step S305 that the OK button 303 is not pushed, the procedure returns to Step S303, and the determination on whether the start button is pushed or not within the specified period of time is repeated in order to prevent the battery from being run out by performing process of photographing or the like for a long time.

If it is determined in Step S305 that the OK button is pushed, the procedure proceeds to Step S306 and the operator identification operating section 232 performs the identification process. That is, in Step S306, the operator identification operating section 232 makes the operator biometric information acquiring section 203 to acquire the biometric information of the operator, and to provide the acquired biometric information to the operator biometric information matching section 204. The operator biometric information matching section 204 matches the biometric information provided from the operator biometric information acquiring section 203 with a registered information of the user 1, which is stored in advance. The operator biometric information matching section 204 provides data indicating a result of the matching to the operator identification operating section 232.

More specifically, in Step S306, the operator identification operating section 232 makes the operator biometric information acquiring section 203 to photograph a face of the operator, and to provide image data of the photographed face to the operator biometric information matching section 204. In this case, the operator biometric information acquiring section 203 is configured with, for example, a CCD (Charge Coupled Device) camera or a CMOS (Complementary Metal Oxide Semiconductor) sensor camera, etc.

In addition, when the operator's face is photographed in a dark place, the operator biometric information acquiring section 203 may photograph the operator's face which is illuminated by, for example, an LED (Light Emitting Diode).

In this way, even when the abnormality is notified to the portable electronic device 17 in the dark place, the operator can be identified since the operator's face can be illuminated and photographed not being influenced by ambient conditions.

In addition, for example, the operator biometric information matching section 204 matches the facial image of the operator provided from the operator biometric information acquiring section 203 with the registered information indicating features of the face of the user 1, and provides data indicating a result of the matching to the operator identification operating section 232.

Further, the biometric information matching process is feasible by the information providing apparatus 34, which will be described later with reference to FIG. 18.

In Step S308, based on the data indicating the result of the matching provided from the operator biometric information matching section 204, the operator identification operating section 232 identifies the operator whether the operator is an authorized person or not, and provides a signal indicating a result of the identification to the security data extracting section 233. In addition, based on the signal indicating the result of the identification provided by the operator identification operating section 232, the security data extracting section 233 determines whether the operator is identified as the authorized person or not.

If it is determined in Step S308 that the operator is not identified as the authorized person, the procedure returns to Step S304, and the message for identifying the user 1 again is displayed.

If it is determined in Step S308 that the operator is identified as the authorized person (the user 1), the procedure proceeds to Step S309, and the security data extracting section 233 makes the output section 57 of the portable electronic device 17 to display a message indicating that the operator is identified as the authorized person.

Figure 15:
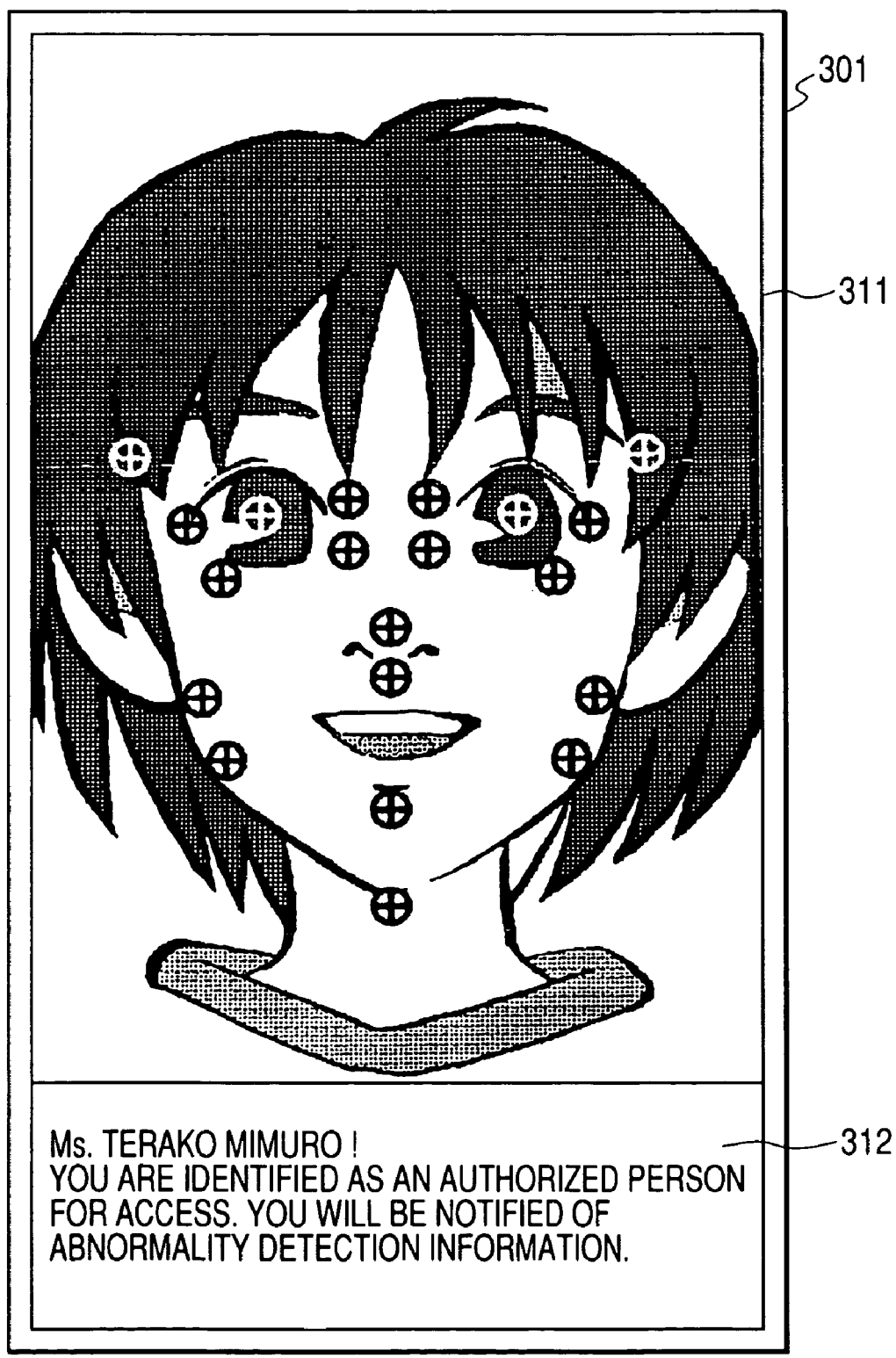
FIG. 15 is a diagram showing an example of a screen of a portable electronic device.

FIG. 15 is a diagram showing an example of an image displayed on the screen 301 when the operator is identified as the authorized person.

For example, when the identification process is performed based on a facial image of the operator, the operator biometric information acquiring section 203 photographs the facial image of the operator, and simultaneously displays the photographed facial image of the operator 311 on the screen 301. The operator biometric information matching section 204 matches feature points of the photographed facial image of the operator 311 with the registered information.

When the operator is identified as the authorized person, a message 312 such as "Ms. Terako Mimuro! You are identified as an authorized person for access. You will be notified of abnormality detection information." is displayed on the screen 301.

In this way, since the process of the biometric identification is performed, for example, when the user 1 loses the portable electronic device 17 of the user 1, persons other than the registered user 1 are not allowed to operate the lost portable electronic device 17, and, as a result, mischief and the like by other persons can be prevented.

In Step S310, the security data extracting section 233 makes the radio transceiver unit 201 to request the information providing apparatus 34 to provide the trespass-related data, and to receive the trespass-related data sent from the information providing apparatus 34 through the network 32 in accordance with the request. The security data extracting section 233 provides the positional information of the security object included in the received trespass-related data to the security object positional information displaying section 207 and the security measure selection operating section 208, and provides the name and state information of the security object to the security measure selection operating section 208.

In Step S311, based on the positional information of the security object provided from the security data extracting section 233, the security object positional information displaying section 207 displays the positional information of the security object, that is, the address, name, and telephone information such as the telephone number, of the place where the abnormality occurs, on the screen 301 of the portable electronic device 17. Based on the positional information of the security object and the name and state information of the security object provided by the security data extracting section 233, the security measure selection operating section 208 displays an image of the place where the abnormality occurs, measure menus, etc. on the screen 301 of the portable electronic device 17.

Figure 16:
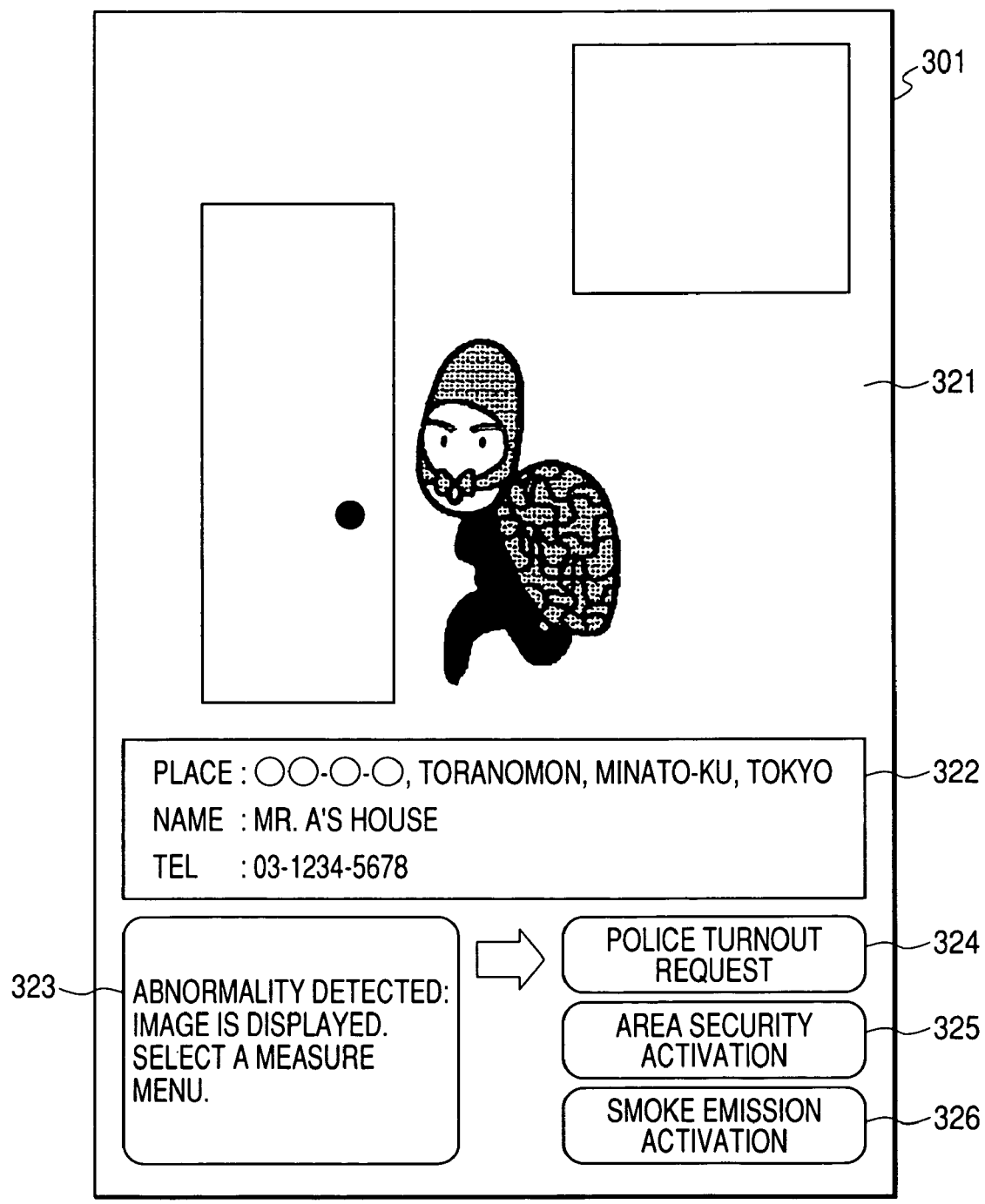
FIG. 16 is a diagram showing an example of a screen of a portable electronic device.

FIG. 16 is a diagram showing an example of the screen 301 of the portable electronic device 17 on which the address, name, and telephone information such as the telephone number, of the place where the abnormality occurs, the image of the place where the abnormality occurs, the measure menus, etc. are displayed.

As shown in FIG. 16, for example, an image of the place where the abnormality occurs 321 (for example, an image of a thief trespassing on a house), information 322 on the address, name, and telephone number of the place where the abnormality occurs, a measure menu guidance 323 including a message such as "Abnormality detected: The image is displayed on the screen. Select a measure menu", a police turnout request button 324, an area security activating button 325, and a smoke emission activating button 326 are displayed on the screen 301 of the portable electronic device 17.

In addition, the measure menus are not limited to the police turnout request button 324, the area security activating button 325, and the smoke emission activating button 326, but may further include, for example, a security alarm button for threatening a suspect with an alarm sound, an illumination threatening button for threatening the suspect with illumination, etc.

In Step S312, based on the operating signal provided by the key input section 209, the security measure selection operating section 208 determines whether the police turnout request menu is selected or not.

If it is determined in Step S312 that the police turnout request button 324 is not pushed, that is, the police turnout request menu is not selected, the procedure returns to Step S301 and the process is repeated again until the radio transceiver unit 201 receives the trespass-related data.

If it is determined in Step S312 that the police turnout request menu is selected, the procedure proceeds to Step S313, and the security measure selection operating section 208 makes the telephone number acquiring section 212 to extract a telephone number of the telephone redirecting device 18 which is closest to the security object, from the regional telephone number recording section 213, and provides the extracted telephone number to the dialer 214.

Based on the telephone number provided from the telephone number acquiring section 212, the dialer 214 is connected to one of the telephone redirecting devices 18-1 to 18-J. The one of the telephone redirecting devices 18-1 to 18-J transmits the connection from the portable electronic device 17 to one of the telephones 37-1 to 37-K of the police closest to the security object.

In this way, the portable electronic device 17 can be connected to one of the telephones 37-1 to 37-K of the police closest to the security object.

In Step S314, based on a signal indicating that the portable electronic device 17 is connected to the police, which is provided by the dialer 214, the security measure selection operating section 208 displays a message indicating that the portable electronic device 17 is connected to the police for turnout request on the screen 301 of the portable electronic device 17.

Figure 17:
FIG. 17 is a diagram showing an example of a screen of a portable electronic device.

As shown in FIG. 17, for example, when the portable electronic device 17 is connected to one of the telephones 37-1 to 37-K of the police closest to the security object, a message 331 such as "This phone is connected to the police turnout commanding center according to your turnout request. Please speak information on a place for turnout and the content of abnormality with a microphone." is displayed on the screen 301 of the portable electronic device 17. That is, at the same time when a handset of one of the telephones 37-1 to 37-K of the police closest to the security object, which is called by the transmitted connection of the portable electronic device 17, is lifted up, the message 331 is displayed on the screen 301 of the portable electronic device 17.

In this way, the user 1 can surely know that the connection to the police is achieved.

In Step S315, the voice call operating section 215 supports a call with the police by displaying a lip icon 332, etc., indicating that the police is speaking on the screen 301 of the portable electronic device 17, by acquiring voice of the police.

In this way, by displaying the lip icon 332 or the like on the screen 301 of the portable electronic device 17, the operator can intuitively perceive a start of the report since the operator can visually confirm a start of the call with the police.

That is, based on the lip icon 332, the user 1 can know that the police begins to speak and, accordingly, can immediately respond to the police. Conversely speaking, the user 1 can confirm the image 321 of the place where the abnormality occurs and the information 322 on the address, name and telephone of the place where the abnormality occurs displayed on the screen 301 until the police begins to speak. Accordingly, the user 1 can more accurately and surely inform the police of the address, name and telephone of the place where the abnormality occurs immediately when notification to the police is started.

In Step S316, the voice call recording section 241 records the voice data, such as the call with the police, provided from the voice call operating section 215, along with information on time.

In Step S317, based on the operating signal for disconnection provided from the key input section 209, the dialer 214 disconnects the connection of the radio transceiver unit 201 with the police. When the connection with the police is disconnected, the voice call recording section 241 provides the voice data such as the call with the police, including the time information, to the sending message operating section 206.

In Step S318, the sending message operating section 206 makes the radio transceiver unit 201 to be connected to the information providing apparatus 34 through the base station 35 and the network 32.

In Step S319, the sending message operating section 206 makes the radio transceiver unit 201 to transmit the voice data such as the call with the police, including the time information, to the information providing apparatus 34 through the base station 35 and the network 32.

As described above, the information providing apparatus 34 receives the voice data sent from the portable electronic device 17 through the base station 35 and the network 32, and stores and records the received voice data as a file in association with the abnormal event file.

In Step S320, since the electronic mail including the storage number is sent from the information providing apparatus 34 through the network 32 and the base station 35, the receiving message operating section 231 makes the radio transceiver unit 201 to receive the electronic mail and provides the received mail to the normal message operating section 205. Then, the procedure is terminated.

In the process of Step S320, the mail received in the radio transceiver unit 201 by the receiving message operating section 231 is the mail sent from the information providing apparatus 34 in the process of Step S207.

That is, the user 1 can confirm that the voice data is recorded in the information recording apparatus 34 by confirming the mail provided to the normal message operating section 205.

Figure 18:
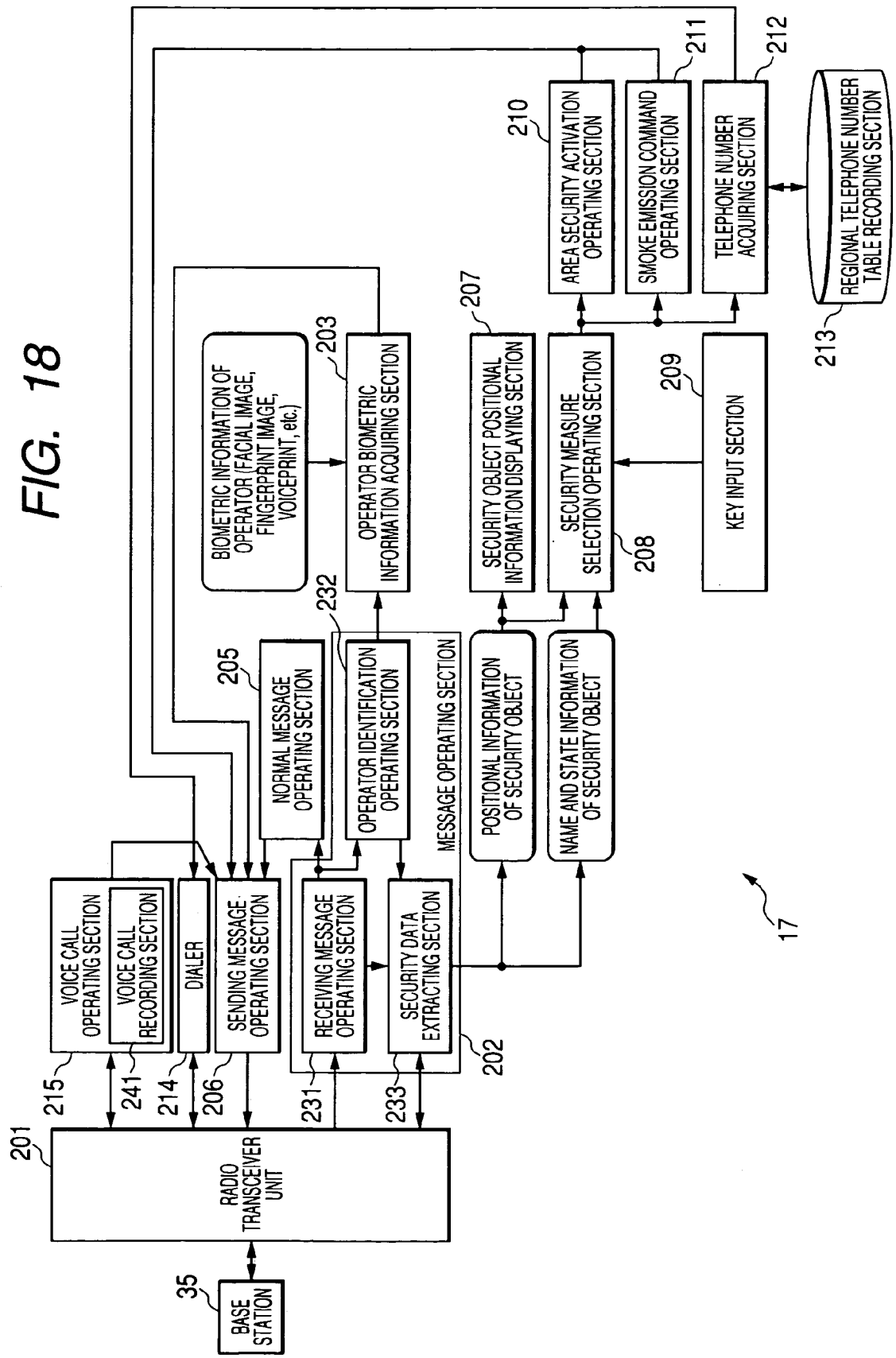
FIG. 18 is a block diagram showing another functional configuration of a portable electronic device according to an embodiment of the present invention.

FIG. 18 is a block diagram showing another configuration of the portable electronic device 17 according to the present invention in the case where the biometric information matching process is performed by the information providing apparatus 34. In FIG. 18, the same elements as those shown in FIG. 6 are denoted by the same reference numerals, and explanation thereof will be omitted.

The operator biometric information acquiring section 203 acquires the biometric information of the operator (for example, a facial image, a fingerprint image, or a voiceprint, etc.), and provides the acquired biometric information to the sending message operating section 206.

The sending message operating section 206 makes the radio transceiver unit 201 to send the biometric information provided by the operator biometric information acquiring section 203 to the information providing apparatus 34 through the base station 35 and the network 32.

Based on the biometric information sent from the sending message operating section 206, the biometric information matching section 104 (FIG. 5) of the information providing apparatus 34 matches the biometric information. The biometric information matching section 104 provides data indicating a result of the matching to the transmitting section 105 of the information providing apparatus 34.

The transmitting section 105 (FIG. 5) of the information providing apparatus 34 stores, as a type of message, the data indicating the result of the matching provided by the biometric information matching section 104 of the information providing apparatus 34, and sends the message storing the data indicating the result of the matching to the portable electronic device 17 through the network 32 and the base station 35.

The radio transceiver unit 201 of the portable electronic device 17 receives the message storing the data indicating the result of the matching sent from the information providing apparatus 34, and provides the received message to the receiving message operating section 231. The receiving message operating section 231 extracts the data indicating the result of the matching from the message, and provides the data indicating the result of the matching to the operator identification operating section 232.

The operator identification operating section 232 performs an identification process based on the data indicating the result of the matching in the information providing apparatus 34.

In this way, by making the information providing apparatus 34 to perform the identification process, load of the process of the portable electronic device 17 can be alleviated and the whole process of the portable electronic device 17 can be quickly performed.

As above description, when a behavior endangering or possibly endangering safety of property, possessions or loan of the user 1, or safety of a person having some connection with the user 1 occurs, the address and name of the place where such a behavior occurs can be displayed. As a result, the user 1 can more quickly and accurately notify the police and the like of the place where the behavior occurs.

In addition, when a person notifies the police, the fire station and the like of the place where the behavior occurs, it can be confirmed whether or not the person is an authorized person. As a result, mischief or an incorrect notification can be prevented.

Although a series of processes as described above may be performed by hardware, it may be performed by software. When the series of processes is performed by software, the software is installed from a readable medium in a computer having a dedicated hardware incorporating programs composing the software, for example, a personal computer in which various programs are installed and various functions can be performed using the installed programs, etc.

As shown in FIG. 4, the readable medium may be a package media incorporating programs, including the magnetic disk 71 (including a flexible disk), the optical disk 72 (including CD-ROM (Compact Disc-Read Only Memory) and DVD (Digital Versatile Disc)), the optical magnetic disk 73, or the semiconductor memory 74, which are distributed in order to provide the programs to users, separately from the computer. The readable medium may also be a ROM incorporating the programs or a hard disk, etc. included in a recording section, which are provided to users being incorporated in a computer in advance.

In addition, if necessary, the programs executing the series of processes as described above may be installed within a computer through a wired or wireless communication medium, such as a local area network, Internet or a digital satellite broadcasting, via an interface such as a router or a modem.

Further, in this specification, the steps of describing the programs stored in the readable medium include processes performed on a parallel or individual basis as well as on a time-series basis according to a suggested order.

In addition, in this specification, the system refers to the whole of apparatuses constituted by a plurality of apparatuses.

In addition, in this specification and the following claims, "or" has the same meaning as a logical sum of a logical function. That is, "A or B" represents that at least one of A and B is established. More specifically, if A is true and B is true, "A or B" is true. If A is true and B is false, "A or B" is true. If A is false and B is true, "A or B" is true. If A is false and B is false, "A or B" is false.

In other words, in this specification and the following claims, if any one of two conditions (requirements) connected to each other by "or" is established, and if both of the two conditions connected to each other by "or" are established, the entire condition represented by "or" is established. On the contrary, if both of the two conditions connected to each other by "or" are not established, the entire condition represented by "or" is not established.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A notifying system comprising:
   an apparatus that provides data indicative of an abnormal behavior concerning safety; and
   a portable electronic device that notifies a user of a detection of the abnormal behavior,
   wherein said apparatus includes:
   a first receiver that receives an address of a location where the abnormal behavior takes place and a site image indicative of a content of the abnormal behavior; and
   a transmitter that transmits the data including the address and the site image to the portable electronic device, and
   wherein said portable electronic device includes:
   a second receiver that receives the data from the apparatus;
   an identifying section that identifies whether an operator is authorized to receive the notification, based on biometric information;
   a display that, when it is identified that the operator is authorized to receive the notification, displays the address and the site image included in the data, and an abnormality measure menu including a menu for requesting a predetermined organization to take a measure for the abnormal behavior; and
   a processing section that, when the menu for requesting the predetermined organization to take the measure for the abnormal behavior is selected by the operator based on the site image displayed on the display, controls a connection of a communication network to the predetermined organization so as to enable a communication between the operator and the predetermined organization.

2. A portable electronic device for notifying a user of detection of an abnormal behavior concerning safety based on data indicative of the abnormal behavior and provided by an information providing apparatus, said portable electronic device comprising:
   a receiver that receives the data, which includes an address of a location where the abnormal behavior takes place and a site image indicative of a content of the abnormal behavior, from the information providing apparatus;
   an identifying section that identifies whether an operator is authorized to receive the notification, based on biometric information;
   a display that, when it is identified that the operator is authorized to receive the notification, displays the address and the site image included in the data, and an abnormality measure menu including a menu for requesting a predetermined organization to take a measure for the abnormal behavior; and
   a processing section that, when the menu for requesting the predetermined organization to take the measure for the abnormal behavior is selected by the operator based on the site image displayed on the display, controls a connection of a communication network to the predetermined organization so as to enable a communication between the operator and the predetermined organization.

3. A method for notifying a user of detection of an abnormal behavior concerning safety based on data indicative of the abnormal behavior and provided by an information providing apparatus, said method comprising:

receiving the data, which includes an address of a location of where the abnormal behavior takes place and a site image indicative of a content of the abnormal behavior, from the information providing apparatus;

identifying whether an operator is authorized to receive the notification, based on biometric information;

displaying, when it is identified that the operator is authorized to receive the notification, the address and the site image included in the data, and an abnormality measure menu including a menu for requesting a predetermined organization to take a measure for the abnormal behavior; and when the menu for requesting the predetermined organization to take the measure for the abnormal behavior is selected by the operator based on the displayed site image, controlling a connection of a communication network to the predetermined organization so as to enable a communication between the operator and the predetermined organization.

4. A computer readable medium comprising a program including instructions for permitting a computer to perform a process for notifying a user of detection of an abnormal behavior concerning safety, based on data indicative of the abnormal behavior and provided by an information providing apparatus, said instructions comprising:

receiving the data from the information providing apparatus, the data including an address of a location where the abnormal behavior takes place and a site image indicative of a content of the abnormal behavior;

identifying whether an operator is authorized to receive the notification, based on biometric information;

displaying, when it is identified that the operator is authorized to receive the notification, the address and the site image included in the data, and an abnormality measure menu including a menu for requesting a predetermined organization to take a measure for the abnormal behavior; and when the menu for requesting the predetermined organization to take the measure for the abnormal behavior is selected by the operator based on the displayed site image, controlling a connection of a communication network to the predetermined organization so as to enable a communication between the operator and the predetermined organization.

5. A notifying system comprising:

an apparatus for providing data indicative of an abnormal behavior concerning safe; and a portable electronic device for notifying a user of a detection of the abnormal behavior, wherein said apparatus includes:

a first receiver that receives location information of the abnormal behavior; and a transmitter that transmits the data including the location information to the portable electronic device, and wherein said portable electronic device includes:

a second receiver that receives the data from the apparatus;

an identifying section that identifies whether an operator is authorized to receive the notification, based on biometric information;

a display that, when the operator is identified as authorized, displays an abnormality measure menu including a menu for requesting a predetermined organization to take a measure for the abnormal behavior; and a processing section that, when the menu for requesting the predetermined organization to take the measure for the abnormal behavior is selected by the operator, controls a connection under a jurisdiction of the location where the abnormal behavior takes place so as to enable a communication between the operator and the predetermined organization under the jurisdiction, based on the location information included in the data.

6. A portable electronic device for notifying a user of detection of an abnormal behavior concerning safety, based on data indicative of the abnormal behavior and provided from an information providing apparatus, said portable electronic device comprising:

a receiver that receives the data including location information of the abnormal behavior from the information providing apparatus;

an identifying section that identifies whether an operator is authorized to receive the notification based on biometric information;

a display that, when the operator is identified as authorized, displays an abnormality measure menu including a menu for requesting a predetermined organization to take a measure for the abnormal behavior; and a processing section that, when the menu for requesting the predetermined organization to take the measure for the abnormal behavior is selected by the operator controls a connection of a communication network to the predetermined organization under a jurisdiction of the location where the abnormal behavior takes place so as to enable a communication between the operator and the predetermined organization under the jurisdiction, based on the location information included in the data.

7. The portable electronic device according to claim 6, further comprising:

a generating section that ac quires the communication on the communication network and generates voice data corresponding to the communication; and a storing section that stores the voice data.

8. The portable electronic device according to claim 7, further comprising:

a transmitter that transmits the voice data and time information indicating when the communication network is connected, to the information providing apparatus.

9. The portable electronic device according to claim 6, wherein the receiver receives the data further including behavior content information, and wherein the display displays the location information and the behavior content information included in the data.

10. A method for notifying a user of detection of an abnormal behavior concerning safety based on data indicative of the abnormal behavior and provided by an information providing apparatus, said method comprising:

receiving the data including location information of the abnormal behavior from the information providing apparatus;

identifying whether an operator is authorized to receive the notification based on biometric information;

displaying, when the operator is identified as authorized, an abnormality measure menu including a menu for requesting a predetermined organization to take a measure for the abnormal behavior; and when the menu for requesting the predetermined organization to take the measure for the abnormal behavior is selected by the operator, controlling a connection of a communication network to the predetermined organization under a jurisdiction of the location where the abnormal behavior takes place so as to enable a communication between the operator and the predetermined organization under the jurisdiction, based on the location information included in the data.

11. A computer readable medium comprising a program including instructions for permitting a computer to perform a process for notifying a user of a detection of an abnormal behavior concerning safety, based on data indicative of the abnormal behavior and provided by an information providing apparatus, said instructions comprising:

receiving the data including location information of the abnormal behavior, transmitted from the information providing apparatus;

identifying whether an operator is authorized to receive the notification based on biometric information;

displaying, when the operator is identified as authorized, an abnormality measure menu including a menu for requesting a predetermined organization to take a measure for the abnormal behavior; and when the menu for requesting the predetermined organization to take the measure for the abnormal behavior is selected by the operator, controlling a connection of a communication network to the predetermined organization under a jurisdiction of the location where the abnormal behavior takes place so as to enable a communication between the operator and the predetermined organization under the jurisdiction, based on the location information included in the data.

12. A portable electronic device, comprising:

a transceiver that receives a data generated in response to a detection of an abnormal behavior concerning safety, and transmits said data to an extractor that provides an authenticated user with a message indicative of said abnormal behavior including location information of said abnormal behavior;

an identifying section that identifies whether the operator is authorized to receive the message, based on biometric information;

a communicator that interfaces with said user and a base station to enable communication between said authenticated user and a third party; and an activator that provides said third party with a response command to act on a region where said abnormal behavior is detected based on said message.

* * * * *